United States Patent
Xu et al.

(10) Patent No.: US 11,452,154 B2
(45) Date of Patent: Sep. 20, 2022

(54) INDICATION METHOD AND RELATED DEVICE

(71) Applicant: Huawei Technologies Co., Ltd., Shenzhen (CN)

(72) Inventors: Haibo Xu, Beijing (CN); Nathan Edward Tenny, San Diego, CA (US); Yiru Kuang, Beijing (CN); Jian Wang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 568 days.

(21) Appl. No.: 16/461,653

(22) PCT Filed: Feb. 4, 2017

(86) PCT No.: PCT/CN2017/072875
§ 371 (c)(1),
(2) Date: May 16, 2019

(87) PCT Pub. No.: WO2018/090491
PCT Pub. Date: May 24, 2018

(65) Prior Publication Data
US 2019/0357284 A1    Nov. 21, 2019

(30) Foreign Application Priority Data
Nov. 17, 2016 (CN) .......................... 201611012903.7

(51) Int. Cl.
*H04W 76/14* (2018.01)
*H04B 17/318* (2015.01)
(Continued)

(52) U.S. Cl.
CPC .......... *H04W 76/14* (2018.02); *H04B 17/318* (2015.01); *H04W 8/005* (2013.01);
(Continued)

(58) Field of Classification Search
None
See application file for complete search history.

(56) References Cited

U.S. PATENT DOCUMENTS

2016/0044613 A1   2/2016   Cai et al.
2016/0286374 A1   9/2016   Baghel et al.
(Continued)

FOREIGN PATENT DOCUMENTS

CN   101577673 A   11/2009
CN   101841890 A   9/2010
(Continued)

OTHER PUBLICATIONS

Intel Corporation, "Discussion on relay based scenarios for FeD2D", 3GPP TSG RAN WG2 Meeting #95, R2-164836, Gothenburg, Sweden, Aug. 22-26, 2016, 5 pages.
(Continued)

*Primary Examiner* — Robert M Morlan
(74) *Attorney, Agent, or Firm* — Slater Matsil, LLP

(57) ABSTRACT

An indication method includes: receiving, by first user equipment, a first message sent by second user equipment, where the first message includes information indicating that the second user equipment supports an evolved user equipment-to-network relay function; and receiving, by the first user equipment, a second message sent by a network device, where the second message includes information indicating that the network device supports an evolved user equipment-to-network relay, or the second message includes information indicating that a cell in which the network device sends the second message supports an evolved user equipment-to-network relay.

19 Claims, 20 Drawing Sheets

(51) Int. Cl.
*H04W 8/00* (2009.01)
*H04W 48/08* (2009.01)
*H04W 88/04* (2009.01)
*H04W 76/27* (2018.01)
*H04W 92/18* (2009.01)

(52) U.S. Cl.
CPC ........... *H04W 48/08* (2013.01); *H04W 88/04* (2013.01); *H04W 76/27* (2018.02); *H04W 92/18* (2013.01)

(56) References Cited

U.S. PATENT DOCUMENTS

| | | | | |
|---|---|---|---|---|
| 2017/0164332 | A1* | 6/2017 | Kim | H04W 40/246 |
| 2018/0092017 | A1* | 3/2018 | Freda | H04W 76/23 |
| 2018/0295497 | A1* | 10/2018 | Kim | H04W 60/04 |
| 2018/0317268 | A1* | 11/2018 | Kim | H04W 40/246 |
| 2019/0059015 | A1* | 2/2019 | Lee | H04W 28/06 |
| 2019/0373647 | A1* | 12/2019 | Rugeland | H04W 76/10 |

FOREIGN PATENT DOCUMENTS

| | | |
|---|---|---|
| CN | 103634812 A | 3/2014 |
| CN | 105228218 A | 1/2016 |
| CN | 105246027 A | 1/2016 |
| WO | 2016148543 A1 | 9/2016 |
| WO | 2016150107 A1 | 9/2016 |
| WO | 2016153774 A1 | 9/2016 |

OTHER PUBLICATIONS

Ericsson, "User plane architecture", 3GPP TSG-RAN WG2 #96, Reno, Nevada, R2-168214, Nov. 14-18, 2016, 5 pages.

3GPP TR 23.703 V12.0.0 (Feb. 2014), 3rd Generation Partnership Project; Technical Specification Group Services and System Aspects; Study on architecture enhancements to support Proximity-based Services (ProSe), (Release 12), Feb. 2014, 324 pages.

* cited by examiner

| Discovery type | Content type | Discovery model |
|---|---|---|

INDICATION METHOD AND RELATED DEVICE

CROSS-REFERENCE TO RELATED APPLICATIONS

This application is a national stage of International Application No. PCT/CN2017/072875, filed on Feb. 4, 2017, which claims priority to Chinese Patent Application No. 201611012903.7, filed on Nov. 17, 2016. Both of the aforementioned applications are hereby incorporated by reference in their entireties.

TECHNICAL FIELD

The present invention relates to the field of communications technologies, and in particular, to an indication method and a related device.

BACKGROUND

A device-to-device (Device-to-Device, D2D) communication manner is a communication manner in which a transmit end directly sends data to a receive end, without a need to transfer the data by using a base station or through a cellular network. A relatively special manner in the D2D communication manner is that user equipment (User Equipment, UE) is connected to a network by using another UE having a relay function. Usually, the former is referred to as remote user equipment (namely, Remote UE), and the latter is referred to as relay user equipment (namely, Relay UE, or UE-to-Network Relay).

An IP layer (or referred to as a layer 3)-based relay mechanism is defined in the 3rd Generation Partnership Project (3rd Generation Partnership Project, 3GPP) Rel 13. To be specific, the remote UE is connected to and communicates with the network by using the relay UE, and the relay UE forwards communication data between the remote UE and the network through an IP layer. In a layer 3-based relay, only a sidelink technology established in the 3GPP is used between the remote UE and the relay UE for connection and communication. Using the layer 3 relay mechanism may not ensure service continuity and cannot implement visibility, management, and control of a network side over the remote UE. To overcome a deficiency of the layer 3 relay, a data relay manner based on a layer above an RLC layer and under a PDCP layer may be used. This is also a current research topic in the LTE Rel 15. This manner of forwarding data at a layer above the RLC layer and under the PDCP layer of the relay UE may be referred to as a layer 2 UE-to-NW relay. In this case, the remote UE may be referred to as evolved remote UE (namely, eRemote UE), and the relay UE may be referred to as evolved relay UE (namely, eRelay UE or Evolved UE-to-NW relay, evolved user equipment-to-network relay). In a layer 2-based relay, in addition to using the sidelink technology for connection, a non-3GPP access technology may be used between the eRemote UE and the eRelay UE for connection, for example, a WLAN and Bluetooth.

When a cell that supports the layer-3 relay and a cell that supports the layer-2 relay share a same carrier, and UE that supports the layer-3 relay and UE that supports the layer-2 relay coexist in a same cell, how the eRemote UE knows whether the relay UE supports the layer-2 relay, and how the eRemote UE knows whether a current serving cell of the eRemote UE supports the layer-2 relay is a technical problem that is to be urgently resolved in the art.

SUMMARY

To resolve the foregoing problem, embodiments of the present invention provide an indication method and a related device.

According to a first aspect, an embodiment of the present invention provides an indication method, including: receiving, by first user equipment, a first message sent by second user equipment, where the first message includes information indicating that the second user equipment supports an evolved user equipment-to-network relay function; and receiving, by the first user equipment, a second message sent by a network device, where the second message includes information indicating that the network device supports an evolved user equipment-to-network relay, or the second message includes information indicating that a cell in which the network device sends the second message supports an evolved user equipment-to-network relay. It can be learned that, relay user equipment and a network device notify, by using indication information, eRemote UE that the relay user equipment and the network device support a layer-2 relay, or notify the eRemote UE that a cell in which the relay user equipment and the network device send the indication information supports the layer-2 relay. Therefore, a case in which after establishing a connection to relay user equipment that does not support a layer-2 relay function, the eRemote UE cannot establish a connection to and communicate with a network by using the relay user equipment is avoided. In addition, resource waste caused in this process can also be avoided, and an access delay or a data communication delay of remote user equipment can be reduced.

In some feasible implementations, the first message is a device-to-device discovery message, or the first message is a radio resource control layer (RRC) message. When the first message is a discovery message, the remote user equipment may learn, in a relay user equipment discovery process, whether discovered relay user equipment supports the layer-2 relay function, to avoid the case in which after establishing the connection to the relay user equipment that does not support the layer-2 relay function, the remote user equipment cannot establish the connection to and communicate with the network by using the relay device. When the first message is an RRC message, a case in which a discovery message for a sidelink technology is sent through a non-3GPP technology may be avoided.

In some feasible implementations, when a content type of the discovery message is a first preset value, the discovery message is an evolved user equipment-to-network relay discovery announcement message, or the discovery message is an evolved user equipment-to-network relay discovery response message. Using this implementation may avoid occupying an additional bit.

In some feasible implementations, the discovery message includes first indication information, the first indication information is used to indicate that the second user equipment supports the evolved user equipment-to-network relay function, and/or the first indication information is used to indicate that the second user equipment is an evolved user equipment-to-network relay. For second user equipment that supports both a layer-3 relay and a layer-2 relay, the second user equipment may send only one discovery message, and does not need to separately send a discovery message for the layer-3 relay and a discovery message for the layer-2 relay, thereby saving resource overheads.

In some feasible implementations, the discovery message includes second indication information and/or third indication information, the second indication information is used to indicate that the second user equipment supports an evolved user equipment-to-network relay function for connecting to the first user equipment through a sidelink, and the third indication information is used to indicate that the second user equipment supports an evolved user equipment-to-network relay function for connecting to the first user equipment by using a non-3GPP interface. This can clearly distinguish between support of the second user equipment for the layer-2 relay function based on the sidelink technology and support of the second user equipment for the layer-2 relay based on a non-3GPP technology.

In some feasible implementations, the RRC message includes related system information of a serving cell in which the second user equipment is located; or the RRC message includes fourth indication information, and the fourth indication information is used to indicate that the second user equipment supports the evolved user equipment-to-network relay function.

In some feasible implementations, the receiving, by first user equipment, a first message sent by second user equipment includes: when the first user equipment supports a connection to the second user equipment through the sidelink, receiving, by the first user equipment through the sidelink, the first message sent by the second user equipment; and when the first user equipment supports a connection to the second user equipment by using the non-3GPP interface, receiving, by the first user equipment by using the non-3GPP interface, the first message sent by the second user equipment. For first user equipment that supports only the non-3GPP interface technology, when the sidelink technology is not used, the first user equipment may also learn whether the second user equipment supports the layer-2 relay function.

In some feasible implementations, the receiving, by first user equipment, a first message sent by second user equipment includes: receiving, by the first user equipment through the sidelink, the first message sent by the second user equipment. For first user equipment that supports both the sidelink technology and the non-3GPP interface technology, the first user equipment may receive, through the sidelink technology, the first message sent by the second user equipment.

In some feasible implementations, an adaptation layer is configured for the first user equipment, and the receiving, by the first user equipment by using the non-3GPP interface, the first message sent by the second user equipment includes: receiving, by the adaptation layer of the first user equipment by using the non-3GPP interface, an adaptation layer protocol data unit (PDU) sent by the second user equipment, where the adaptation layer PDU includes fifth indication information and the first message, and the fifth indication information is used to indicate that the adaptation layer PDU includes the first message.

In some feasible implementations, the receiving, by first user equipment, the discovery message sent by second user equipment includes: receiving, by the first user equipment by listening to a receiving resource pool, the discovery message sent by the second user equipment, where the receiving resource pool is used to receive the device-to-device discovery message sent by the evolved user equipment-to-network relay. By defining a resource pool dedicated to layer-2 relay discovery, power waste caused by blindly receiving a discovery message by the first user equipment can be avoided.

In some feasible implementations, the second message includes first configuration information of the first user equipment and second configuration information of the second user equipment. The network device may control, by using the first configuration information and the second configuration information, on the one hand, a condition that the first user equipment and the second user equipment initiate a layer-2 relay-based manner for transmitting data, and may implicitly indicate, on the other hand, that the network device supports a layer-2 relay operation.

In some feasible implementations, the second configuration information includes a first threshold, and the first threshold is used to indicate that the second user equipment is allowed to send the first message to the first user equipment when an RSRP of a Uu link is higher than the first threshold.

In some feasible implementations, for the first user equipment connected to the second user equipment through the sidelink, the first configuration information includes at least one of the following: (1) a second threshold, where the second threshold is used to indicate that the first user equipment is allowed to send an evolved user equipment-to-network relay discovery solicitation message when an RSRP of a Uu link is lower than the second threshold; and (2) a third threshold, where the third threshold is used to indicate that the first user equipment is allowed to use the second user equipment as a candidate evolved user equipment-to-network relay when an RSRP of the sidelink between the first user equipment and the second user equipment is higher than the third threshold.

In some feasible implementations, for the first user equipment connected to the second user equipment by using the non-3GPP interface, the first configuration information includes at least one of the following: (1) a fourth threshold, where the fourth threshold is used to indicate that the first user equipment is allowed to indirectly communicate with a network by using the second user equipment when an RSRP of a Uu link is lower than the fourth threshold; and (2) a fifth threshold, where the fifth threshold is used to indicate that the first user equipment uses the second user equipment as a candidate evolved user equipment-to-network relay when channel quality of a non-3GPP link between the first user equipment and the second user equipment is higher than the fifth threshold.

According to a second aspect, an embodiment of the present invention provides an indication method, including: sending, by a network device, a second message, where the second message includes information indicating that the network device supports an evolved user equipment-to-network relay, or the second message includes information indicating that a cell in which the network device sends the second message supports an evolved user equipment-to-network relay. It can be learned that, a network device notifies, by using indication information, eRemote UE and relay UE that a cell in which the network device sends the indication information supports a layer-2 relay. Therefore, a case in which after establishing a connection to relay user equipment that does not support a layer-2 relay function, the eRemote UE cannot establish a connection to and communicate with a network by using the relay user equipment is avoided. In addition, resource waste caused in this process can also be avoided, and an access delay or a data communication delay of remote user equipment can be reduced.

In some feasible implementations, the second message includes first configuration information of the first user equipment and second configuration information of the second user equipment. The network device may control, by using the first configuration information and the second configuration information, on the one hand, a condition that the first user equipment and the second user equipment initiate a layer-2 relay-based manner for transmitting data, and may implicitly indicate, on the other hand, that the network device supports a layer-2 relay operation.

In some feasible implementations, the second configuration information includes a first threshold, and the first threshold is used to indicate that the second user equipment is allowed to send a first message to the first user equipment when an RSRP of a Uu link is higher than the first threshold.

In some feasible implementations, for the first user equipment connected to the second user equipment through a sidelink, the first configuration information includes at least one of the following: (1) a second threshold, where the second threshold is used to indicate that the first user equipment is allowed to send an evolved user equipment-to-network relay discovery solicitation message when an RSRP of a Uu link is lower than the second threshold; and (2) a third threshold, where the third threshold is used to indicate that the first user equipment is allowed to use the second user equipment as a candidate evolved user equipment-to-network relay when an RSRP of the sidelink between the first user equipment and the second user equipment is higher than the third threshold.

In some feasible implementations, for the first user equipment connected to the second user equipment by using a non-3GPP interface, the first configuration information includes at least one of the following: (1) a fourth threshold, where the fourth threshold is used to indicate that the first user equipment is allowed to indirectly communicate with a network by using the second user equipment when an RSRP of a Uu link is lower than the fourth threshold; and (2) a fifth threshold, where the fifth threshold is used to indicate that the first user equipment uses the second user equipment as a candidate evolved user equipment-to-network relay when channel quality of a non-3GPP link between the first user equipment and the second user equipment is higher than the fifth threshold.

According to a third aspect, the present invention provides user equipment, including a module that is configured to perform the method in the first aspect.

According to a fourth aspect, the present invention provides a network device, including a module that is configured to perform the method in the second aspect.

According to a fifth aspect, the present invention provides user equipment. The user equipment includes a processor, and the processor is configured to support the user equipment in performing corresponding functions in an indication method in the first aspect. The user equipment may further include a memory. The memory is configured to be coupled to the processor, and stores a program instruction and data that are required for the user equipment. The user equipment may further include a communications interface used for communication between the user equipment and another device or a communications network.

According to a sixth aspect, the present invention provides a network device. The network device includes a processor, and the processor is configured to support the network device in performing corresponding functions in an indication method in the first aspect. The network device may further include a memory. The memory is configured to be coupled to the processor, and stores a program instruction and data that are required for the network device. The network device may further include a communications interface used for communication between the network device and another device or a communications network.

According to a seventh aspect, the present invention provides a computer storage medium that is configured to store a computer software instruction used by the foregoing user equipment in the fifth aspect, and the computer software instruction includes a program designed for performing the foregoing aspect.

According to an eighth aspect, the present invention provides a computer storage medium that is configured to store a computer software instruction used by the foregoing network device in the sixth aspect, and the computer software instruction includes a program designed for performing the foregoing aspect.

Compared with the prior art, in the solutions provided in the present invention, the eRemote UE may learn, by using the indication information, whether the relay UE and a current serving cell support the layer-2 relay.

These aspects or other aspects of the present invention are more concise and understandable in the description of the following embodiments.

BRIEF DESCRIPTION OF THE DRAWINGS

To describe the technical solutions in the embodiments of the present invention or in the background more clearly, the following briefly describes the accompanying drawings required for describing the embodiments of the present invention or the background.

To describe the technical solutions in the embodiments of the present invention or in the prior art more clearly, the following briefly describes the accompanying drawings required for describing the embodiments or the prior art. Apparently, the accompanying drawings in the following description show merely some embodiments of the present invention, and a person of ordinary skill in the art may derive other drawings from these accompanying drawings without creative efforts.

FIG. 3a-i, FIG. 3a-2, FIG. 3a-3, and FIG. 3a-4 are a schematic diagram of a user plane protocol stack architecture of an evolved user equipment-to-network relay based on a layer 2 according to an embodiment of the present invention;

FIG. 3b-1, FIG. 3b-2, FIG. 3b-3, and FIG. 3b-4 are a schematic diagram of a control plane protocol stack architecture of an evolved user equipment-to-network relay based on a layer 2 according to an embodiment of the present invention;

FIG. 4a-i, FIG. 4a-2, FIG. 4a-3, and FIG. 4a-4 are a schematic diagram of another user plane protocol stack architecture of an evolved user equipment-to-network relay based on a layer 2 according to an embodiment of the present invention;

FIG. 4b-1, FIG. 4b-2, FIG. 4b-3, and FIG. 4b-4 are a schematic diagram of another control plane protocol stack architecture of an evolved user equipment-to-network relay based on a layer 2 according to an embodiment of the present invention;

FIG. 5 is a schematic diagram of a format of a message type included in a discovery message according to an embodiment of the present invention;

DETAILED DESCRIPTION OF ILLUSTRATIVE EMBODIMENTS

The following describes the technical solutions in the embodiments of the present invention with reference to the accompanying drawings in the embodiments of the present invention.

Figure 1:
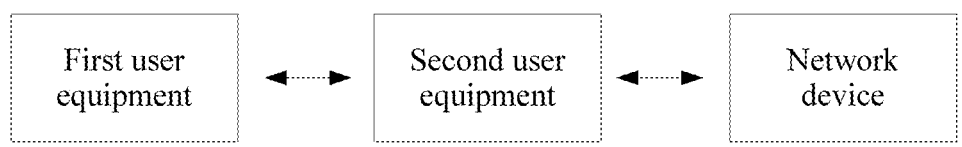
FIG. 1 is a schematic diagram of a communications architecture according to an embodiment of the present invention.

FIG. 1 is a schematic diagram of a network architecture according to an embodiment of the present invention. The network architecture shown in FIG. 1 includes first user equipment 110, second user equipment 120, and a network device 130. The first user equipment 110 is eRemote UE, and the second user equipment is eRelay UE (or may be referred to as an evolved user equipment-to-network relay). A device-to-device communication mechanism based on a 3GPP sidelink/PC5 technology may be used for communication between the first user equipment 110 and the second user equipment 120, and in addition, a non-3GPP technology may be used for communication, for example, a WLAN and a Bluetooth mechanism.

In the following description, the eRelay UE, the evolved UE-to-NW relay, and layer-2 relay UE have a same meaning.

The first user equipment may be a wearable device, such as a smartwatch, a smart band, or a pedometer, or may be an Internet of Things device. The second user equipment is a device that provides a user with voice and/or data connectivity, for example, a handheld device or an in-vehicle device having a wireless connection function. Commonly seen terminals include, for example, a mobile phone, a tablet computer, a notebook computer, a palmtop computer, and a mobile Internet device (mobile Internet device, MID).

The network device is a node device on a network side. For example, the network device may be a radio access network (Radio Access Network, RAN) device on an access network side in a cellular network. The RAN device is a device that connects a terminal to a wireless network, and includes but is not limited to an evolved NodeB (evolved NodeB, eNB), a radio network controller (radio network controller, RNC), a NodeB (NodeB, NB), a base station controller (Base Station Controller, BSC), a base transceiver station (Base Transceiver Station, BTS), a home NodeB (for example, a Home evolved NodeB or a Home NodeB, HNB), and a baseband unit (BaseBand Unit, BBU). For another example, the network device may also be a node device in a wireless local area network (Wireless Local Area Network, WLAN), for example, an access controller (access controller, AC), a gateway, or a Wi-Fi access point (Access Point, AP).

Figure 2:
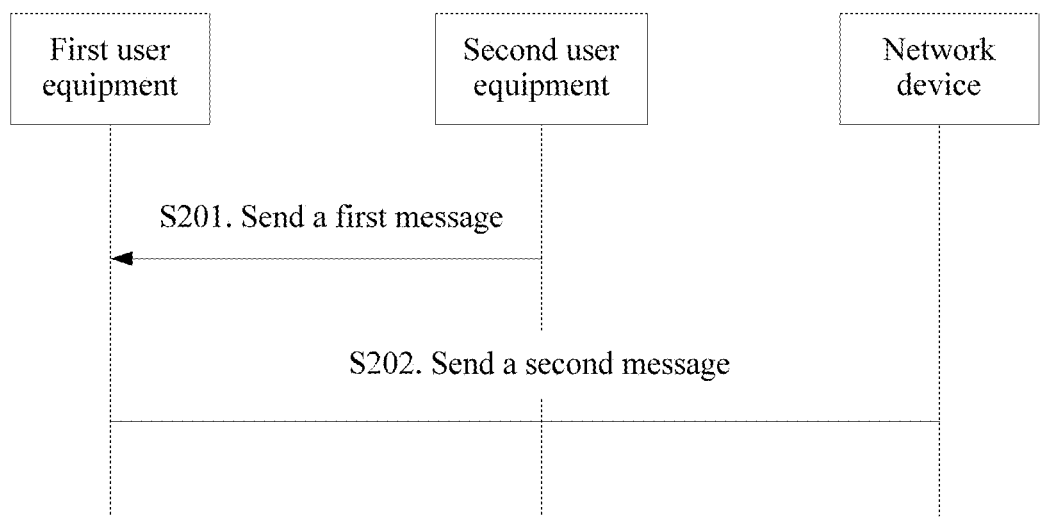
FIG. 2 is a schematic flowchart of an indication method according to an embodiment of the present invention.
Figures 1, 3A:
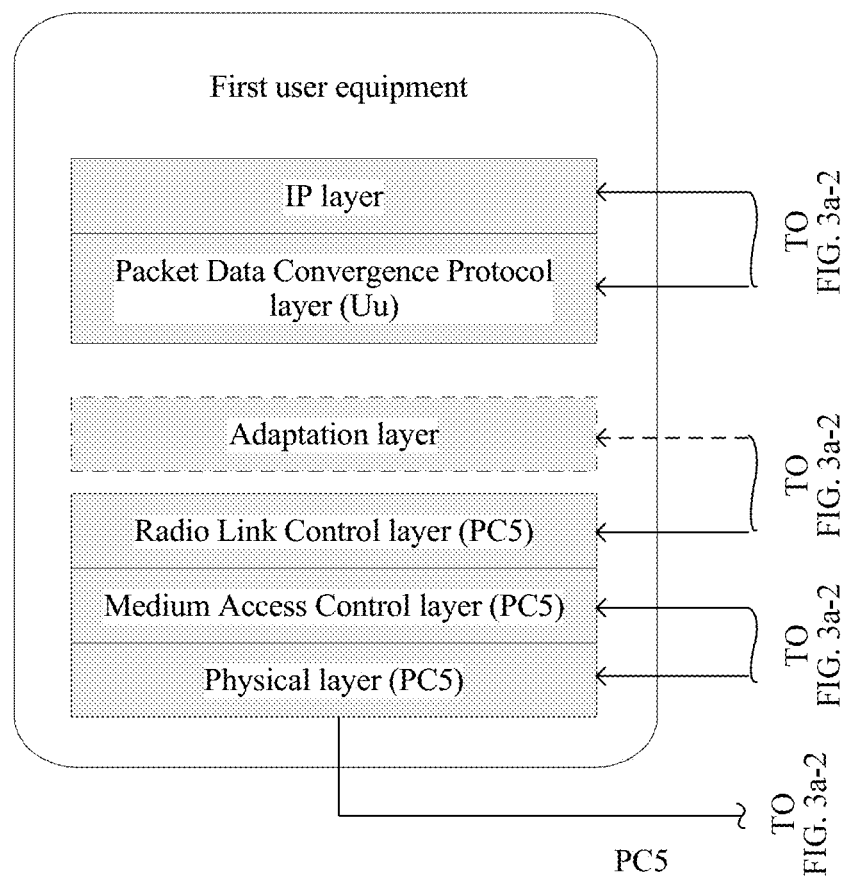
Figures 2, 3A:
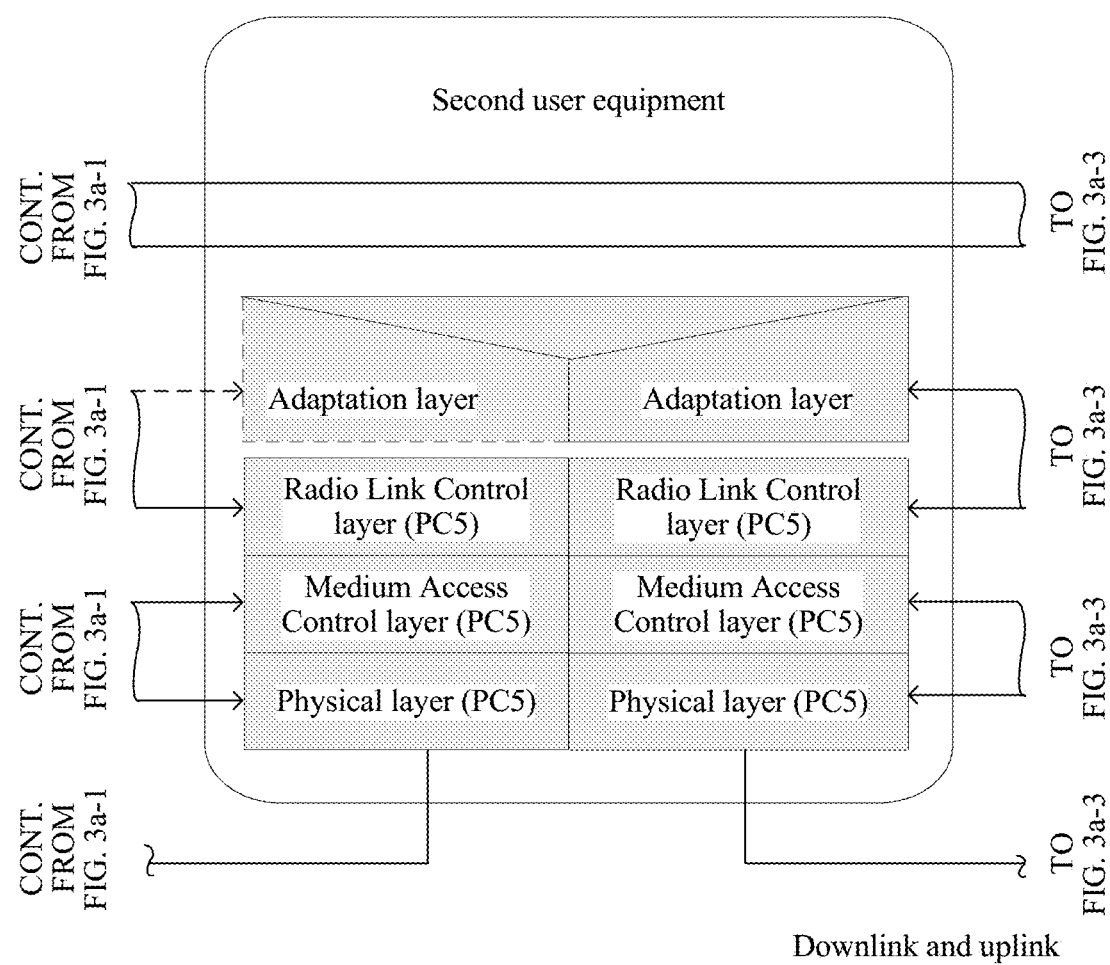
Figures 3, 3A:
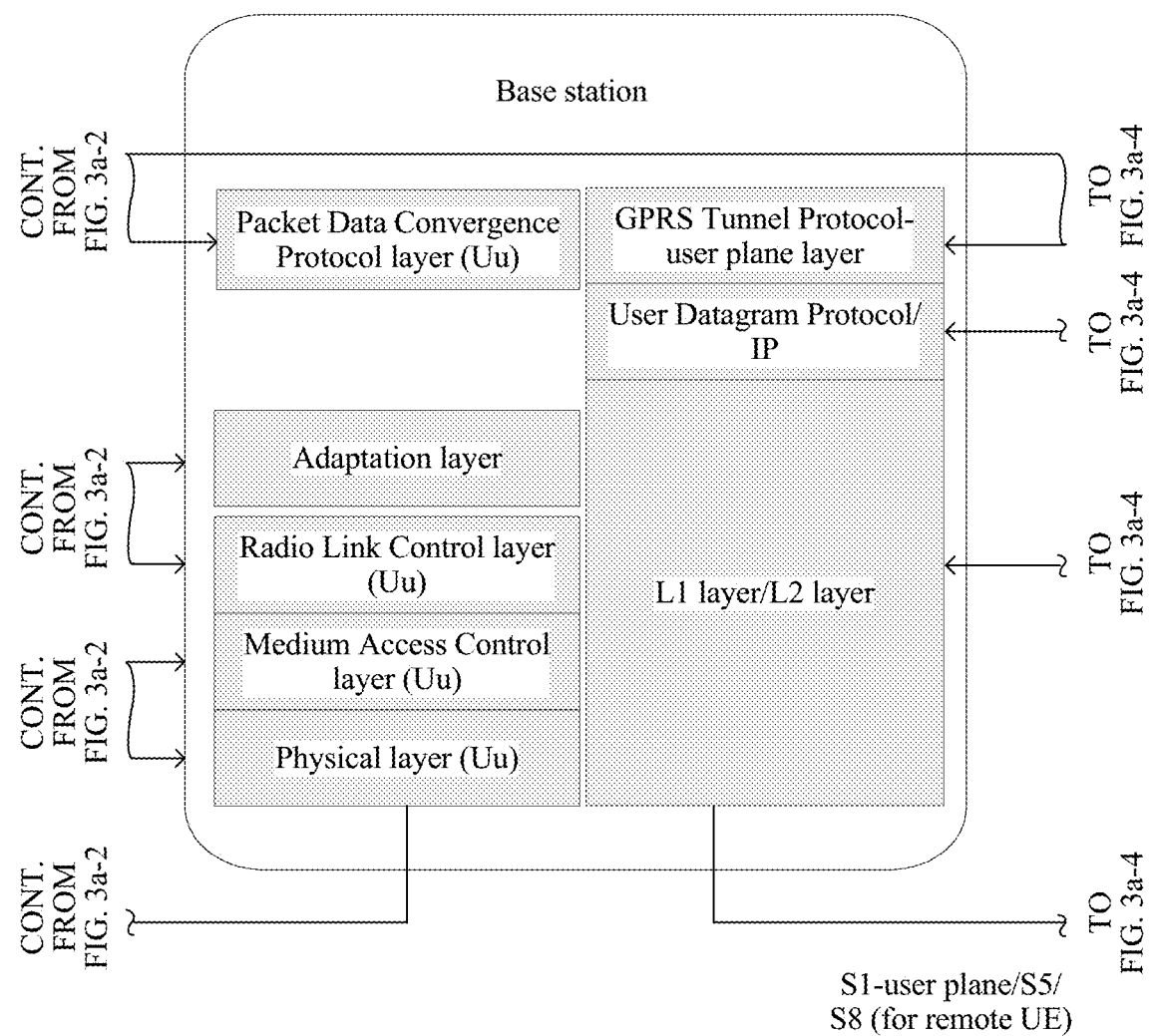
Figures 3, 3A, 4:
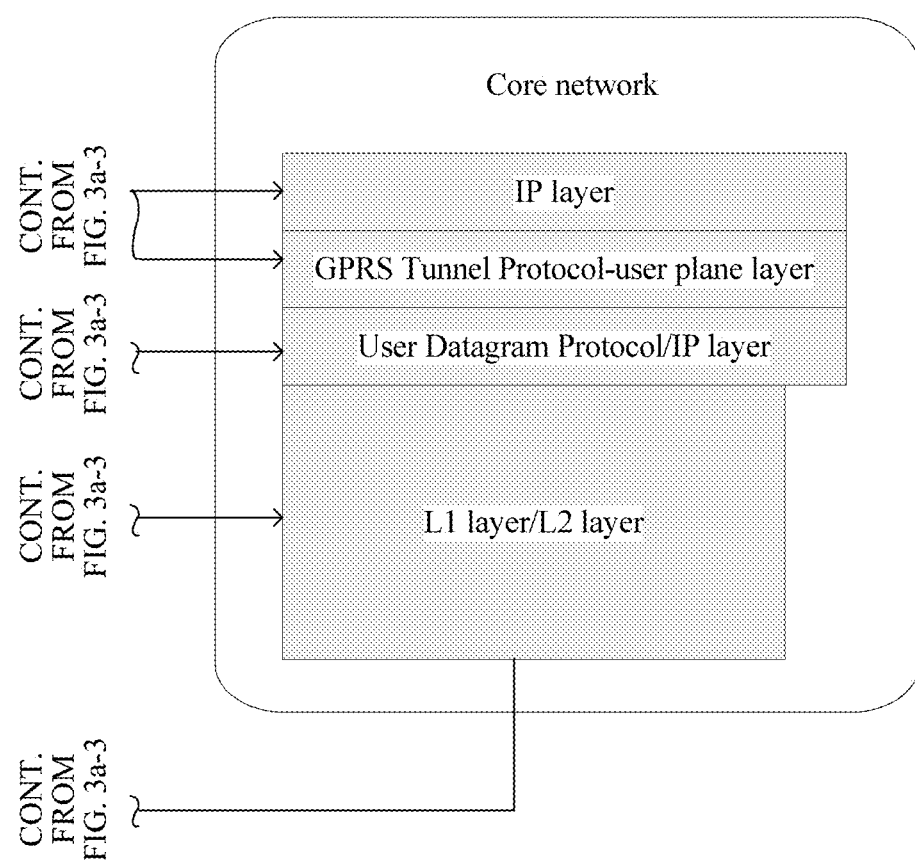
Figures 1, 3B:
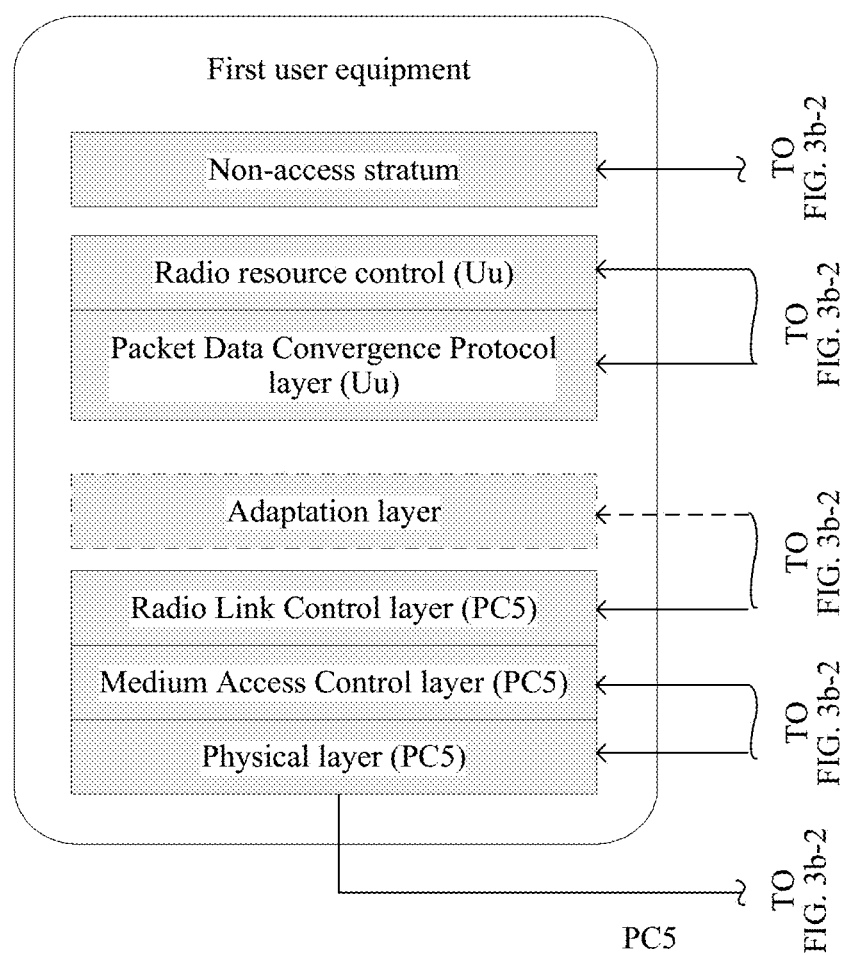
Figures 2, 3B:
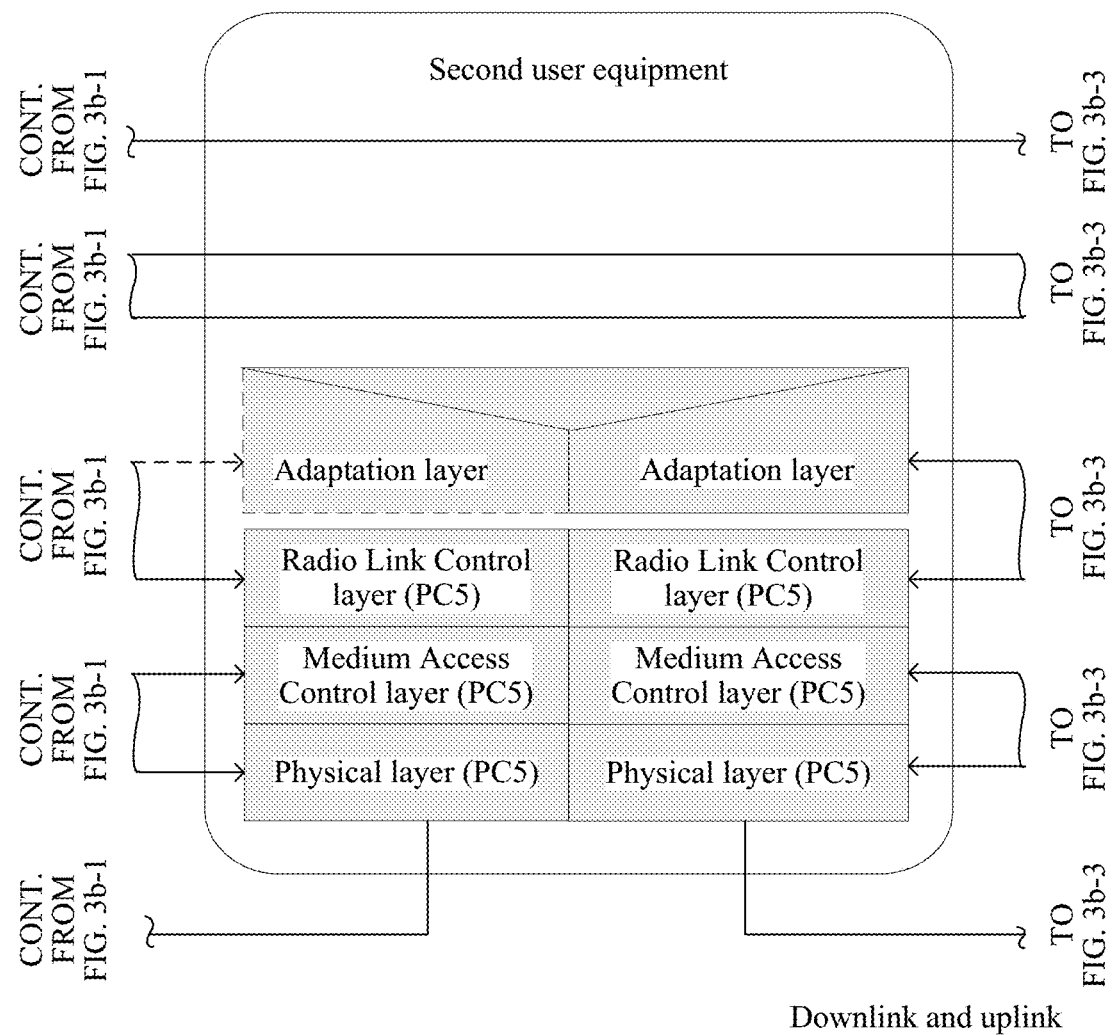
Figures 3, 3B:
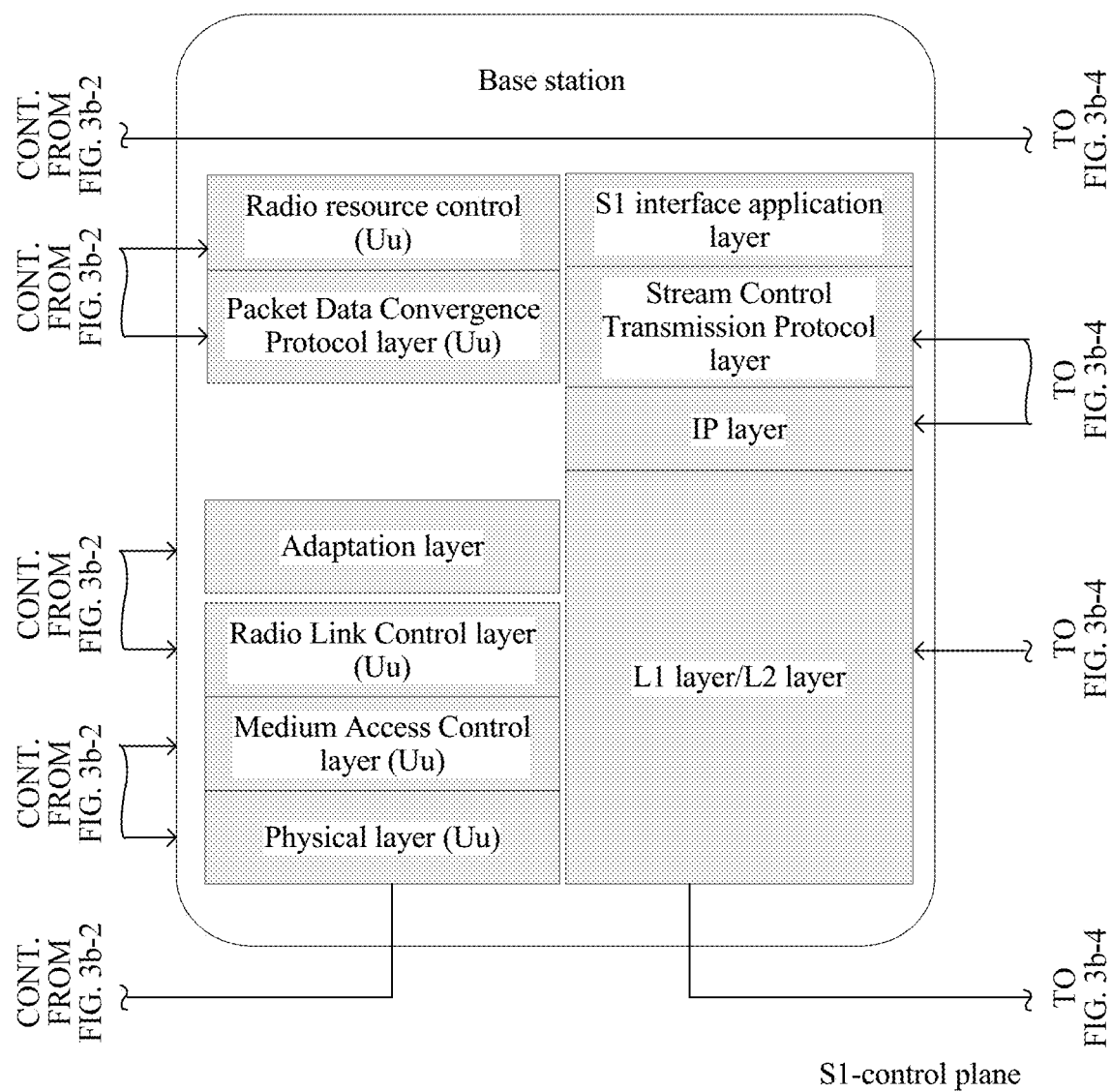
Figures 3, 3B, 4:
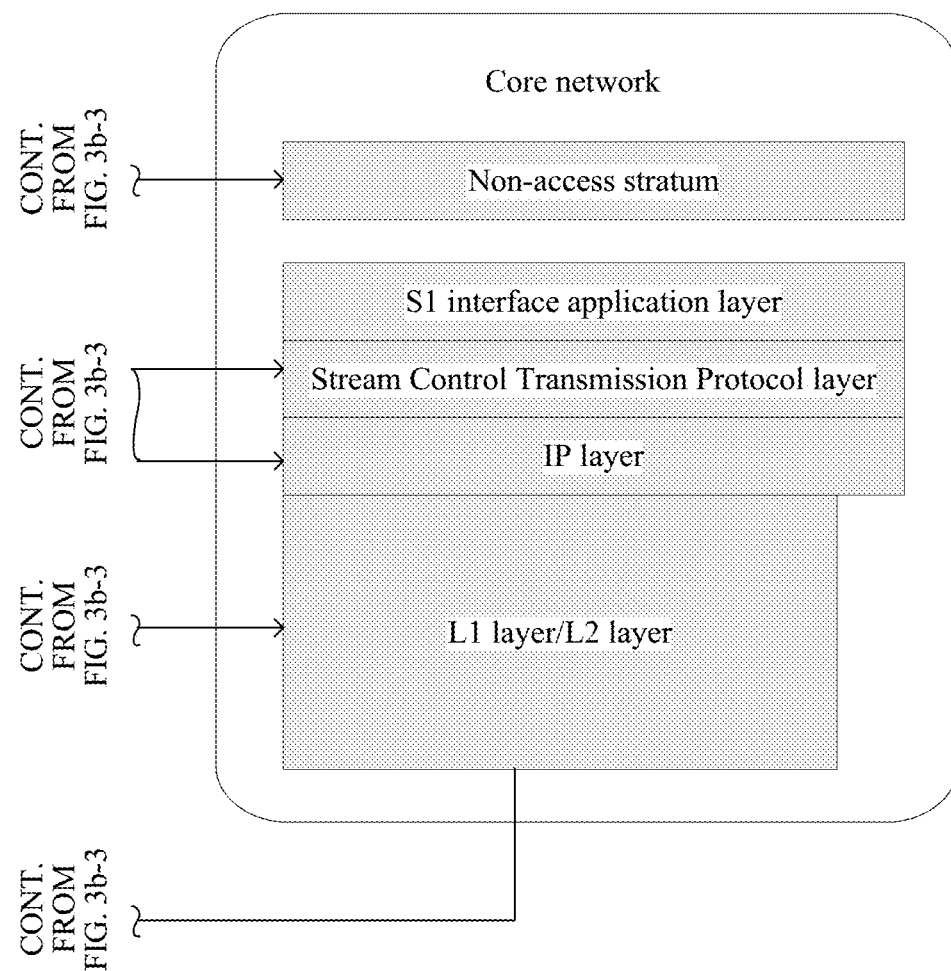

FIG. 2 is a schematic flowchart of an indication method according to an embodiment of the present invention. The method includes the following steps:

S201. Second user equipment sends a first message to first user equipment, and the first user equipment receives the first message sent by the second user equipment, where the first message includes information indicating that the second user equipment supports an evolved user equipment-to-network relay function.

S202. A network device sends a second message, the first user equipment receives the second message sent by the network device, and the second user equipment receives the second message sent by the network device, where the second message includes information indicating that the network device supports an evolved user equipment-to-network relay, or the second message includes information indicating that a cell in which the network device sends the second message supports an evolved user equipment-to-network relay.

The second user equipment supports the evolved user equipment-to-network relay function. To be specific, the second user equipment supports relaying of user plane data and control plane signaling between the first user equipment and a network for the first user equipment by using a protocol stack architecture shown in (FIG. 3a-i, FIG. 3a-2, FIG. 3a-3, and FIG. 3a-4 and FIG. 3b-1, FIG. 3b-2, FIG. 3b-3, and FIG. 3b-4) and/or (FIG. 4a-1, FIG. 4a-2, FIG. 4a-3, and FIG. 4a-4 and FIG. 4b-1, FIG. 4b-2, FIG. 4b-3, and FIG. 4b-4).

FIG. 3a-1, FIG. 3a-2, FIG. 3a-3, and FIG. 3a-4 and FIG. 3b-1, FIG. 3b-2, FIG. 3b-3, and FIG. 3b-4 are corresponding end-to-end protocol stacks of a user plane and a control plane when the first user equipment is connected to the network by using the second user equipment, and the first user equipment is connected to the second user equipment through a sidelink technology. FIG. 3a-1, FIG. 3a-2, FIG. 3a-3, and FIG. 3a-4 are a user plane protocol stack architecture (PC5) of an evolved user equipment-to-network relay based on a layer 2. FIG. 3b-1, FIG. 3b-2, FIG. 3b-3, and FIG. 3b-4 are a control plane protocol stack architecture (PC5) of an evolved user equipment-to-network relay based on a layer 2.

FIG. 4a-1, FIG. 4a-2, FIG. 4a-3, and FIG. 4a-4 and FIG. 4b-1, FIG. 4b-2, FIG. 4b-3, and FIG. 4b-4 are corresponding end-to-end protocol stacks of a user plane and a control plane when the first user equipment is connected to the network by using the second user equipment, and the first user equipment is connected to the second user equipment through a non-3GPP access technology. FIG. 4a-1, FIG. 4a-2, FIG. 4a-3, and FIG. 4a-4 are a user plane protocol stack architecture (non-3GPP access) of an evolved user equipment-to-network relay based on a layer 2. FIG. 4b-1, FIG. 4b-2, FIG. 4b-3, and FIG. 4b-4 are a control plane protocol stack architecture (non-3GPP access) of an evolved user equipment-to-network relay based on a layer 2.

The network device supports an evolved user equipment-to-network relay operation. To be specific, the network device supports an operation that evolved remote user equipment is connected to and transmits service data/control signaling to the network by using evolved relay user equipment.

In an embodiment, the first message is a device-to-device discovery message (discovery message) based on the sidelink technology or a PC5 interface.

In an embodiment (embodiment A), when a content type of the discovery message is a first preset value, it indicates that the discovery message is an evolved user equipment-to-network relay discovery announcement message (evolved UE-to-NW relay discovery announcement), or it indicates that the discovery message is an evolved user equipment-to-network relay discovery response message (evolved UE-to-NW relay discovery Response).

Figures 1, 4A:
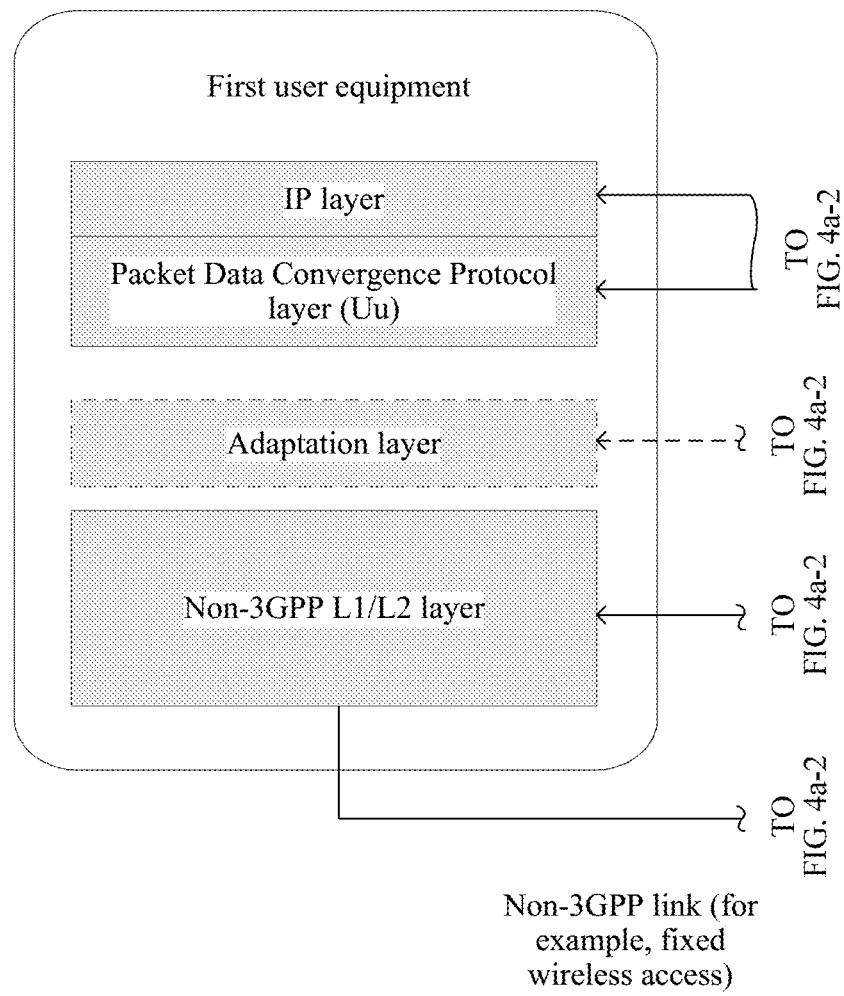
Figures 2, 4A:
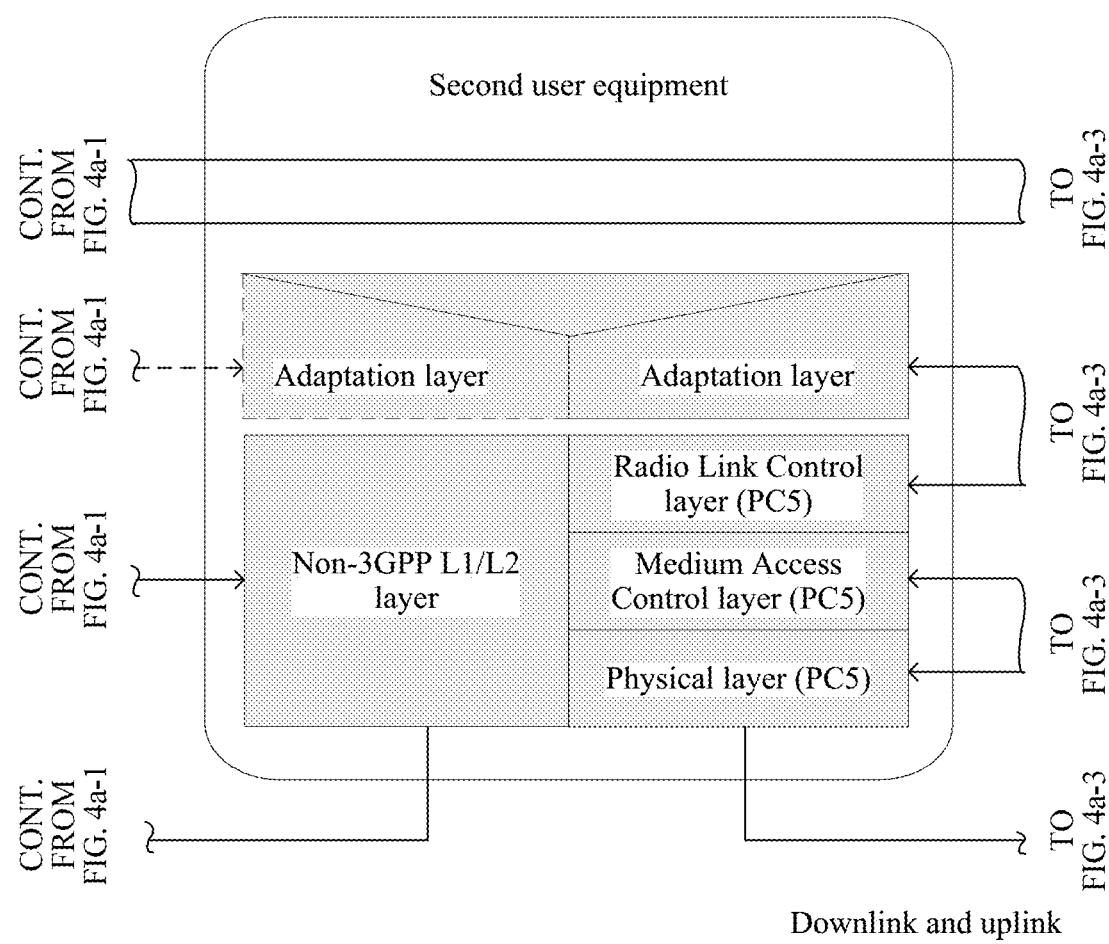
Figures 3, 4A:
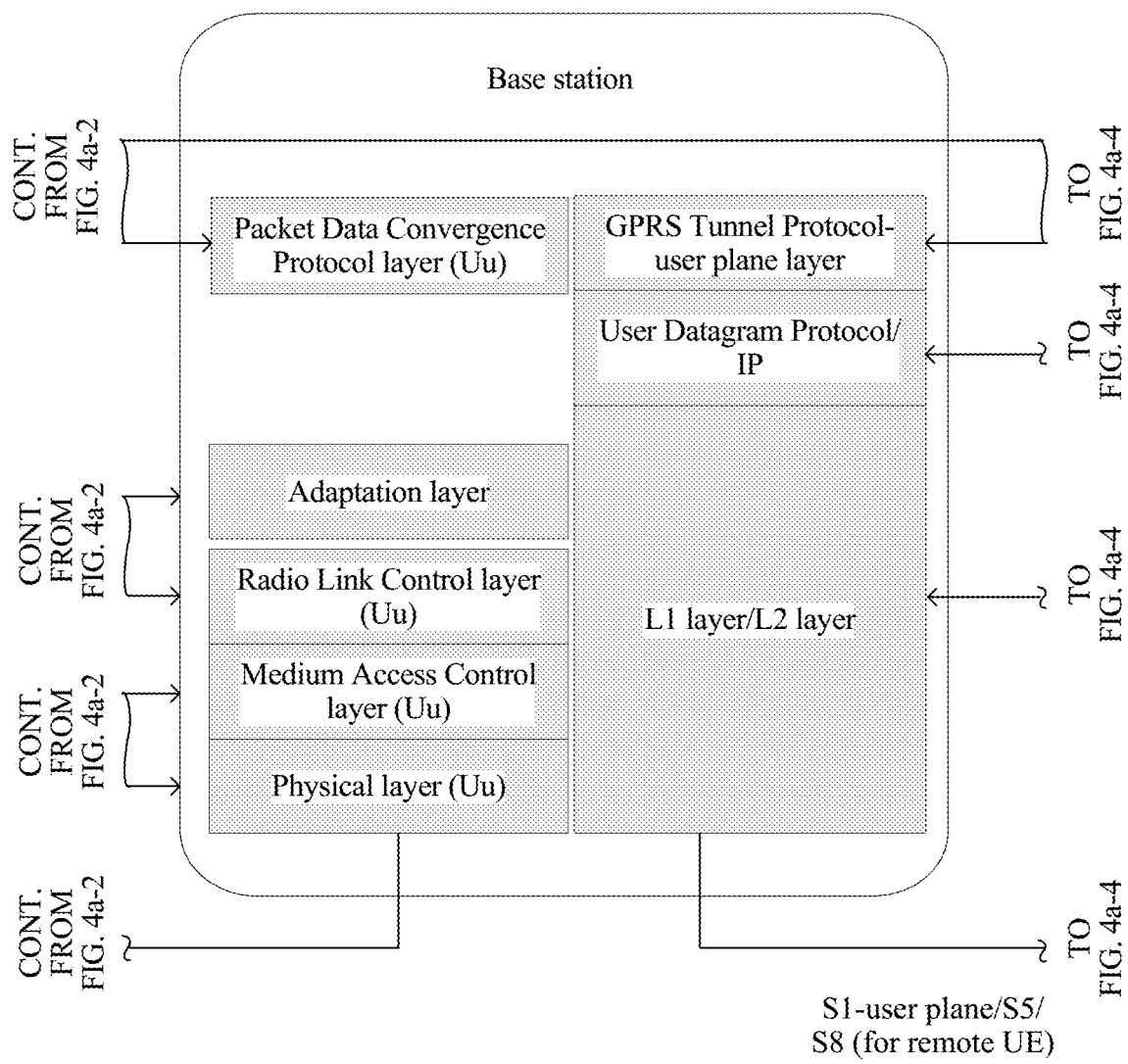
Figures 4, 4A:
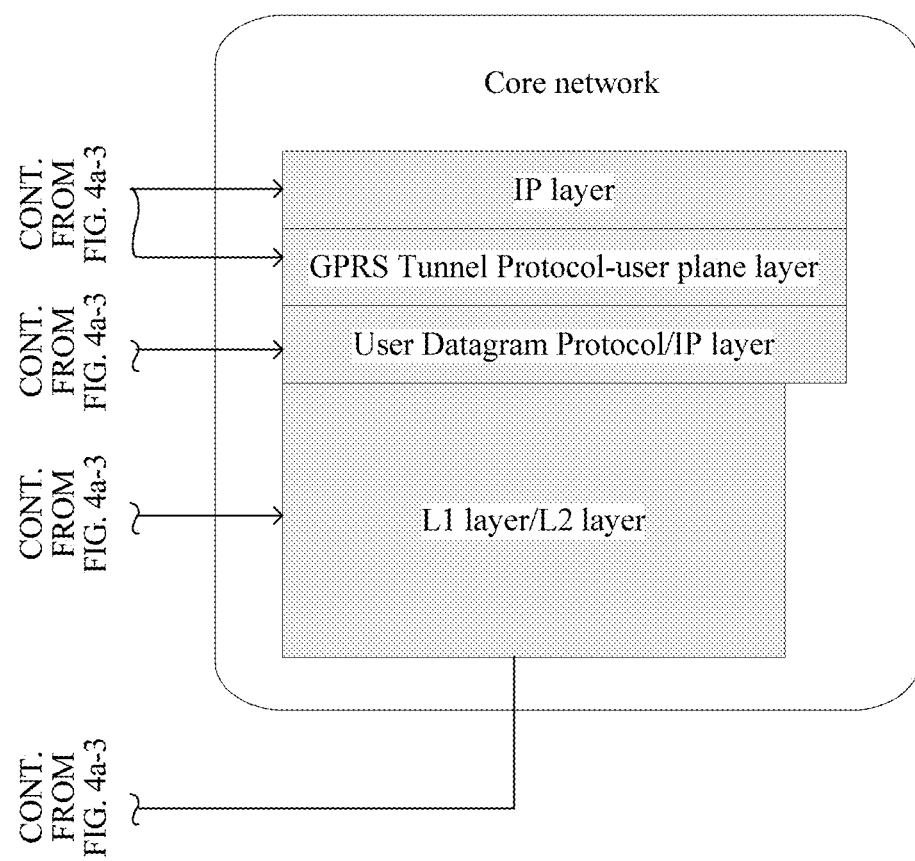
Figures 1, 4B:
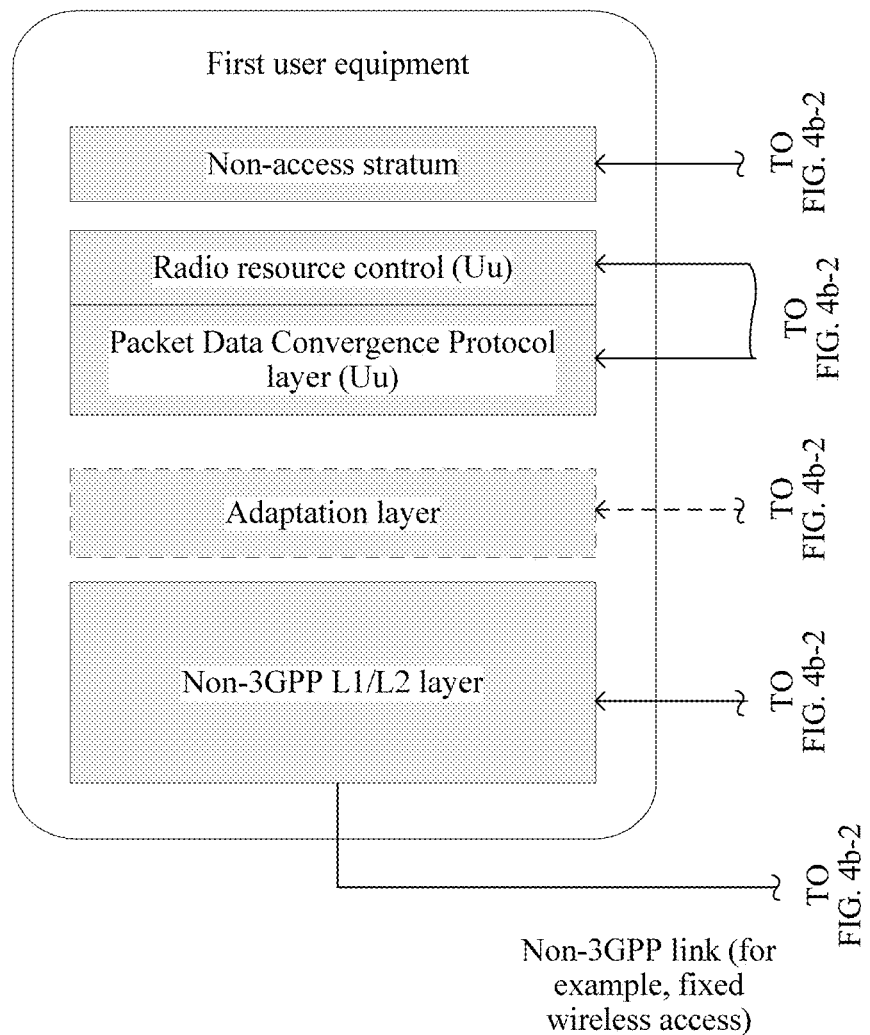
Figures 2, 4B:
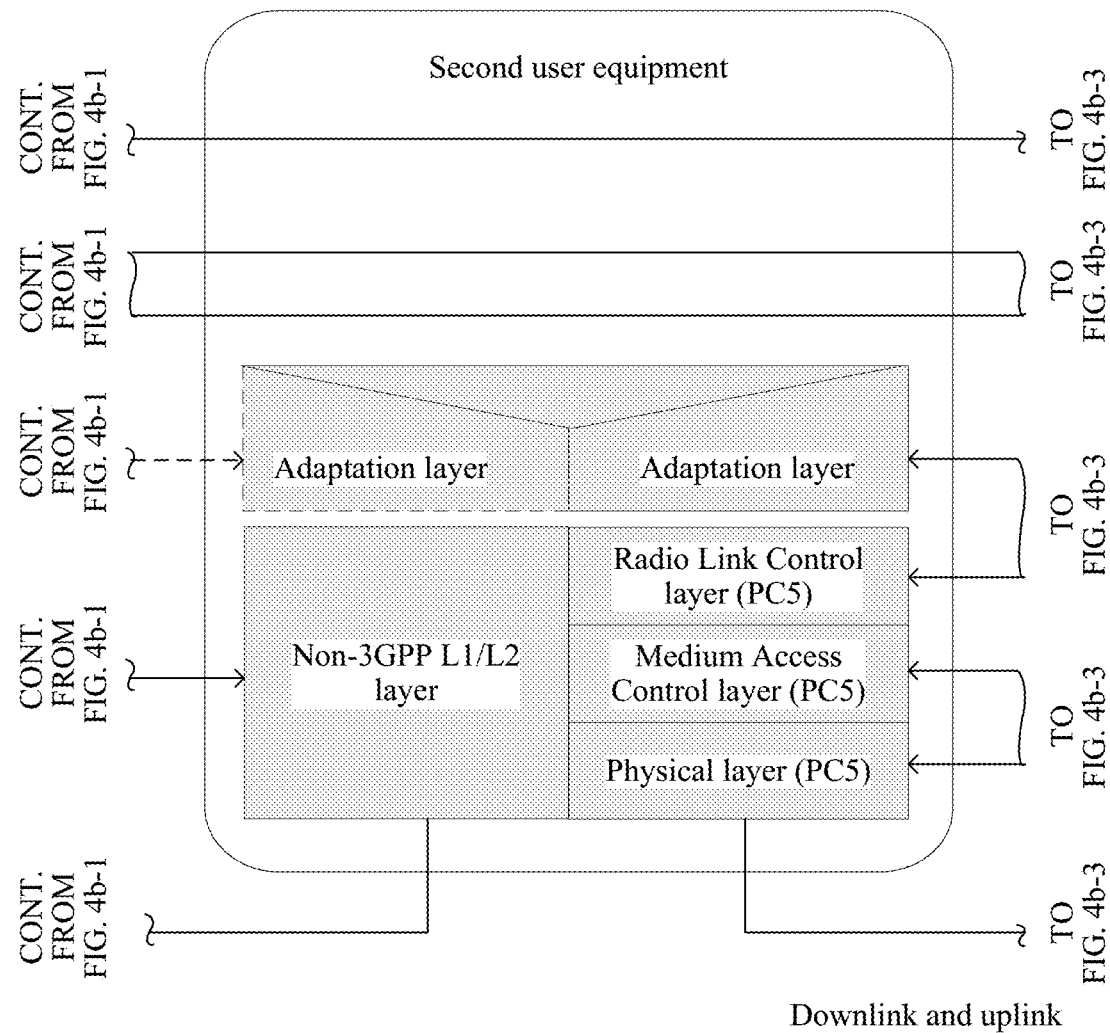
Figures 3, 4B:
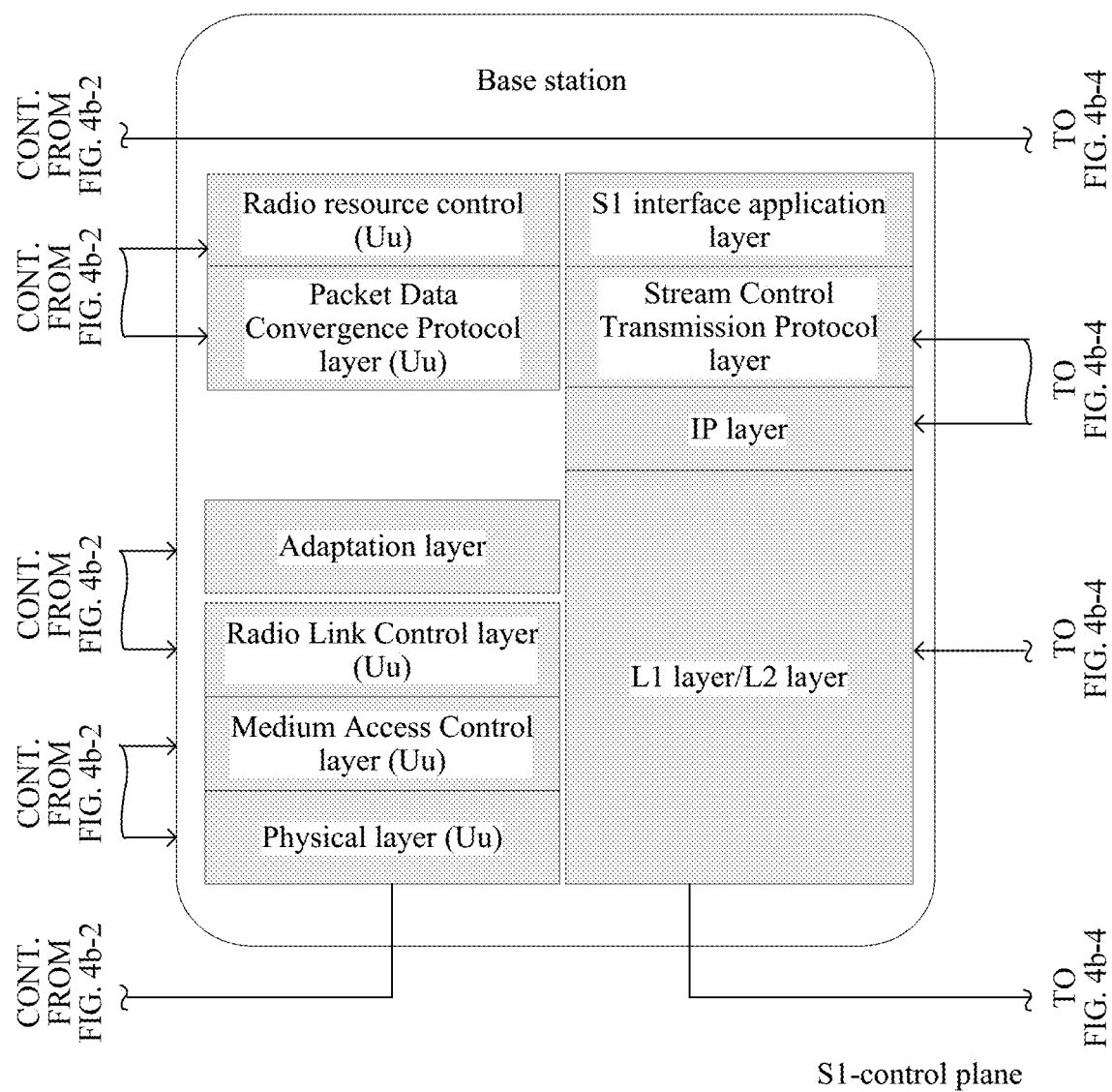
Figures 4, 4B, 5:
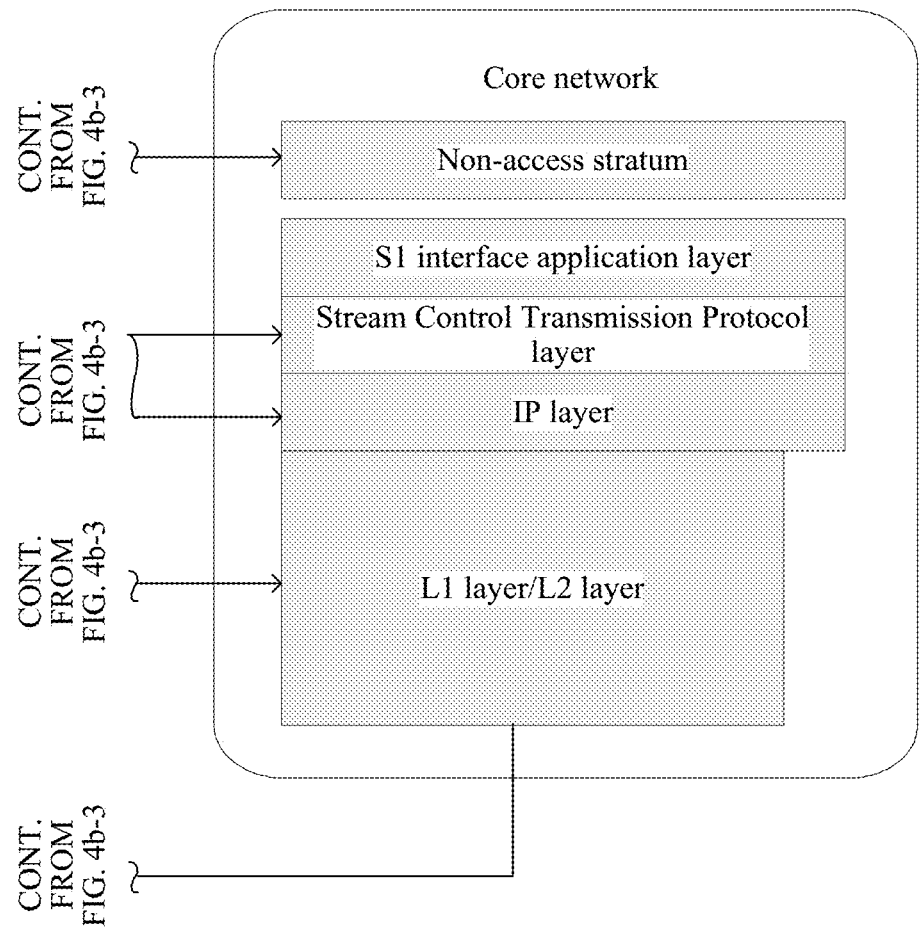

Specifically, a format of a message type (Message Type) included in the discovery message is shown in FIG. 5. Currently, a value of a content type (Content Type) in the message type and a corresponding meaning are shown in Table 1.

TABLE 1

| Value of content type | Corresponding meaning |
|---|---|
| 0000 | Announce/response (announcement/response) |
| 0001 | Query (query) |
| 0010 | Application-controlled extension enabled (application-controlled extension enabled) |
| 0011 | Reserved (reserved) |
| 0100 | UE-to-Network Relay Discovery Announcement or UE-to-Network Relay Discovery Response (UE-to-network relay discovery announcement or UE-to-network relay discovery response) |
| 0101 | UE-to-Network Relay Discovery Solicitation (UE-to-Network relay discovery solicitation) |
| 0110 | Group Member Discovery Announcement or Group Member Discovery Response (group member discovery announcement or group member discovery response) |
| 0111 | Group Member Discovery Solicitation (group member discovery solicitation) |
| 1000 | Relay discovery additional information (relay discovery additional information) |
| 1001 | Reserved (reserved value) |
| 1010 | Reserved |
| 1011 | Reserved |
| 1100 | Reserved |
| 1101 | Reserved |
| 1110 | Reserved |
| 1111 | Reserved |

In this embodiment of the present invention, a corresponding discovery message defined by using a value in current reserved values (for example, 0011 and 1001 to 1111 in Table 1) of the content type is a discovery message for the evolved UE-to-NW relay. For example, if the content type is 1001, a corresponding discovery message is defined as an evolved UE-to-NW relay discovery announcement or evolved UE-to-NW relay discovery response.

For example, when the second user equipment supports only a layer-2 relay function, a value of a content type of a message type in a discovery message sent by the second user equipment is set to 1001. When the second user equipment supports both a layer-2 relay function and a layer-3 relay function, in a discovery process, the second user equipment needs to send two discovery messages, a value of a content type of a message type in one discovery message is set to 0100, and a value of a content type of a message type in the other discovery message is set to 1001.

When the first user equipment that wants to discover a layer-2 relay receives a discovery message whose value of a content type is 1001 and that is sent by the second user equipment, the first user equipment may know that the second user equipment supports the layer-2 relay function, and in addition, a serving cell of the second user equipment also supports a layer-2 relay operation.

In an embodiment (embodiment B), the discovery message includes first indication information, the first indication information is used to indicate that the second user equipment supports the evolved user equipment-to-network relay function, and/or the first indication information is used to indicate that the second user equipment is an evolved user equipment-to-network relay. The discovery message includes but is not limited to the UE-to-network relay discovery announcement message and the UE-to-network relay discovery response message.

Specifically, one piece of 1-bit information (namely, the first indication information) may be set in a PC5 discovery message, and the 1-bit information is used to indicate that the second user equipment supports the layer-2 relay.

Alternatively, a spare bit in the discovery message is used to indicate that the layer-2 relay is supported. Table 2 shows content of the UE-to-network relay discovery announcement message. One piece of new information (namely, the first indication information) is defined by occupying one bit in spare information in Table 2. The newly defined information is used to indicate that the second user equipment supports the layer-2 relay. For example, if the second user equipment supports the layer-2 relay, a value of a newly defined information bit in the discovery message sent by the second user equipment is set to "1", indicating that the second user equipment supports the layer-2 relay.

After receiving the discovery message sent by the second user equipment, the first user equipment that supports the layer-2 relay reads a value of the first indication information in the discovery message. If the value of the first indication information in the discovery message is "1", the first user equipment may determine that the second user equipment supports the layer-2 relay.

TABLE 2

| Information element | Length (bits) |
|---|---|
| Message Type (NOTE) (Message type) | 8 |
| Relay Service Code (Relay service code) | 24 |
| Announcer Info (Announcer information) | 48 |
| ProSe Relay UE ID (Relay UE ID) | 24 |
| Status Indicator (Status indicator) | 8 |
| Spare (Spare bit) | 80 |
| MIC (Message integrity code) | 32 |
| UTC-based Counter LSB (Least significant bit of a UTC (Coordinated Universal Time, Coordinated Universal Time)-based counter) | 8 |

In an embodiment (embodiment C), the discovery message includes second indication information and/or third indication information, the second indication information is used to indicate that the second user equipment supports an evolved user equipment-to-network relay function for connecting to the first user equipment through a sidelink, and the third indication information is used to indicate that the second user equipment supports an evolved user equipment-to-network relay function for connecting to the first user equipment through the non-3GPP access technology.

Specifically, 1-bit information or 2-bit information (namely, the second indication information and/or the third indication information) is set in the PC5 discovery message, and the 2-bit information is used to indicate that the second user equipment supports a layer-2 relay function for connecting to the first user equipment through the sidelink and a layer-2 relay function for connecting to the first user equipment through the non-3GPP access technology. The PC5 discovery message includes but is not limited to the UE-to-network relay discovery announcement message and the UE-to-network relay discovery response message.

Alternatively, the spare bit in the discovery message is used to indicate that the layer-2 relay is supported. As shown in Table 2, Table 2 is the content of the UE-to-network relay discovery announcement message. One or two pieces of new information (namely, the second indication information and/or the third indication information) are defined by occupying one bit or two bits in the spare information in Table 2. The two newly defined pieces of new information are respectively used to indicate that the second user equipment supports the layer-2 relay function for connecting to the first user equipment through the sidelink and the layer-2 relay function for connecting to the first user equipment through the non-3GPP access technology. For example, if the second user equipment supports the layer-2 relay function for connecting to the first user equipment through the sidelink, a value of a newly defined corresponding information bit in the discovery message sent by the second user equipment is set to "1".

After receiving the discovery message sent by the second user equipment, the first user equipment that supports the layer-2 relay reads a value of the second indication information in the discovery message. If the value of the second indication information in the discovery message is "1", the first user equipment may determine that the second user equipment supports the layer-2 relay function for connecting to the first user equipment through the sidelink. Likewise, when the second user equipment supports the layer-2 relay function for connecting to the first user equipment through the non-3GPP access technology, a specific implementation is the same as that described above, and details are not described herein.

In an embodiment, when the second user equipment supports both the evolved user equipment-to-network relay function for connecting to the first user equipment through the sidelink and the evolved user equipment-to-network relay function for connecting to the first user equipment through the non-3GPP technology, the second user equipment sends the first message through the sidelink, and the first user equipment receives, through the sidelink, the first message sent by the second user equipment (to be specific, the second user equipment performs discovery with the first user equipment through a discovery mechanism of the sidelink technology). The first message is used to indicate information that the second user equipment supports the evolved user equipment-to-network relay function. The first message includes the discovery message, and the discovery message includes but is not limited to the UE-to-network relay discovery announcement message and the UE-to-network relay discovery response message. Information included in the discovery message includes one of the following three cases:

(1) A manner described in the foregoing embodiment A and a third indication information manner described in the foregoing embodiment C are used. For example, the value of the content type of the discovery message is set to 1001, indicating that the second user equipment supports the evolved user equipment-to-network relay function for connecting to the first user equipment through the sidelink. In addition, the 1-bit information is set in the discovery message, or one piece of information is defined by using 1 bit in the spare information in the discovery message, and the newly defined information is used to indicate that the second user equipment supports the evolved user equipment-to-network relay function for connecting to the first user equipment by using a non-3GPP interface.

(2) A first indication information manner described in the foregoing embodiment B is used. For example, the 1-bit information is set in the discovery message, or one piece of information is defined by using 1 bit in the spare information in the discovery message, and the newly defined information is used to indicate that the second user equipment supports the evolved user equipment-to-network relay function. To be specific, the second user equipment supports both the evolved user equipment-to-network relay function for connecting to the first user equipment through the sidelink and the evolved user equipment-to-network relay function for connecting to the first user equipment by using the non-3GPP interface.

(3) A second indication information and third indication information manner described in the foregoing embodiment C is used. For example, the 2-bit information is set in the discovery message, or two pieces of information are defined by using 2 bits in the spare information in the discovery message, and the two newly defined pieces of information are respectively used to indicate that the second user equipment supports the evolved user equipment-to-network relay function for connecting to the first user equipment through the sidelink and indicate that the second user equipment supports the evolved user equipment-to-network relay function for connecting to the first user equipment by using the non-3GPP interface.

In an embodiment, when the second user equipment supports the evolved user equipment-to-network relay function for connecting to the first user equipment through the sidelink, the second user equipment sends the first message through the sidelink, and the first user equipment receives, through the sidelink, the first message sent by the second user equipment (to be specific, the second user equipment performs the discovery with the first user equipment through the discovery mechanism of the sidelink technology). The first message is used to indicate information that the second user equipment supports the evolved user equipment-to-network relay function. The first message includes the discovery message, and the discovery message includes but is not limited to the UE-to-network relay discovery announcement message and the UE-to-network relay discovery response message. A message included in the discovery message includes one of the following two cases:

(1) A manner described in the foregoing embodiment A is used. For a specific case, refer to the embodiment A, and details are not described herein again.

(2) A second indication information manner described in the foregoing embodiment C is used. For a specific case, refer to the embodiment C, and details are not described herein again.

In an embodiment, when the second user equipment supports the evolved user equipment-to-network relay function for connecting to the first user equipment through the non-3GPP technology, the second user equipment sends the first message by using the non-3GPP interface, and the first user equipment receives, by using the non-3GPP interface, the first message sent by the second user equipment (to be specific, the second user equipment performs discovery with the first user equipment through a discovery mechanism of the non-3GPP technology). The first message is used to indicate information that the second user equipment supports the evolved user equipment-to-network relay function. The first message includes the discovery message, and the discovery message includes but is not limited to the UE-to-network relay discovery announcement message and the UE-to-network relay discovery response message. A message included in the discovery message includes one of the following two cases:

(1) A manner described in the foregoing embodiment A is used. For a specific case, refer to the embodiment A, and details are not described herein again.

(2) A third indication information manner described in the foregoing embodiment C is used. For a specific case, refer to the embodiment C, and details are not described herein again.

In an embodiment, the method shown in FIG. 2 further includes:

sending, by the first user equipment, a third message, where the third message includes information indicating that the first user equipment needs to discover the evolved user equipment-to-network relay.

In an embodiment, the third message is a device-to-device discovery solicitation message (discovery solicitation message).

In an embodiment (embodiment D), when a content type of the discovery solicitation message is a second preset value, the discovery solicitation message is an evolved user equipment-to-network relay discovery solicitation message (evolved UE-to-network Relay Discovery Solicitation).

When the first user equipment that supports the layer-2 relay wants to discover eRelay UE that supports the layer-2 relay, a value of a content type of a message type in the discovery solicitation message sent by the first user equipment is set to 1010. When the eRelay UE that supports the layer-2 relay receives the discovery solicitation message sent by the first user equipment, if the value of the content type of the message type in the discovery solicitation message is 1010, the eRelay UE may know that the first user equipment needs to discover the eRelay UE that supports the layer-2 relay.

In an embodiment (embodiment E), the discovery solicitation message includes sixth indication information, and the sixth indication information is used to indicate that the first user equipment needs to discover the evolved user equipment-to-network relay.

Specifically, one piece of 1-bit information (namely, the sixth indication information) may be set in the PC5 discovery message, and the 1-bit information is used to indicate that the first user equipment needs to discover the eRelay UE that supports the layer-2 relay. The PC5 discovery message includes but is not limited to a UE-to-network relay discovery solicitation message.

Alternatively, the spare bit in the discovery message is used to indicate that the first user equipment needs to discover the eRelay UE that supports the layer-2 relay. Table 3 shows content of the UE-to-network relay discovery solicitation message. One piece of new information (namely, the sixth indication information) is defined by occupying one bit in spare information in Table 3, and the newly defined information is used to indicate that the first user equipment needs to discover the eRelay UE that supports the layer-2 relay. For example, if the first user equipment needs to discover the eRelay UE that supports the layer-2 relay, a value of a newly defined information bit in the discovery message sent by the first user equipment is set to "1", indicating that the first user equipment needs to discover the eRelay UE that supports the layer-2 relay. After receiving the discovery message sent by the first user equipment, the eRelay UE that supports the layer-2 relay reads a value of the sixth indication information in the discovery message. If the value of the sixth indication information in the discovery message is "1", the eRelay UE that supports the layer-2 relay may determine that the first user equipment needs to discover the relay UE that supports the layer-2 function.

TABLE 3

| Information element | Length (bits) |
| --- | --- |
| Message Type (NOTE 1) (Message type) | 8 |
| Relay Service Code (Relay service code) | 24 |
| Discoverer Info (Discoverer information) | 48 |
| URDS Composition | 8 |
| ProSe Relay UE ID (Relay UE ID) | 24 |
| Spare (Spare bit) | 80 or 104 (NOTE 3) |
| MIC (Message integrity code) | 32 |
| UTC-based Counter LSB (Least significant bit of a UTC (Coordinated Universal Time, Coordinated Universal Time)-based counter) | 8 |

In an embodiment (embodiment F), the discovery solicitation message includes seventh indication information and/or eighth indication information, the seventh indication information is used to indicate that the first user equipment needs to discover the evolved user equipment-to-network relay that supports a connection to the first user equipment through the sidelink, and the eighth indication information is used to indicate that the first user equipment needs to discover the evolved user equipment-to-network relay that supports a connection to the first user equipment through the non-3GPP access technology.

Specifically, 1-bit information or 2-bit information (namely, the seventh indication information and/or the eighth indication information) may be set in the PC5 discovery message, and the 2-bit information is used to indicate that the first user equipment needs to discover the evolved user equipment-to-network relay that supports the connection to the first user equipment through the sidelink, and the evolved user equipment-to-network relay that supports the connection to the first user equipment through the non-3GPP access technology. The PC5 discovery message includes but is not limited to the UE-to-network relay discovery solicitation message.

Alternatively, one spare bit or two spare bits in the discovery message are used to indicate that the eRelay UE that supports the layer-2 relay needs to be discovered. Table 3 shows the content of the UE-to-network relay discovery solicitation message. One or two pieces of new information (namely, the seventh indication information and the eighth indication information) are defined by occupying one bit or two bits in the spare information in Table 3. The two newly defined pieces of new information are respectively used to indicate that the first user equipment needs to discover the evolved user equipment-to-network relay that supports the connection to the first user equipment through the sidelink and needs to discover the evolved user equipment-to-network relay that supports the connection to the first user equipment through the non-3GPP access technology. For example, if the first user equipment needs to discover the evolved user equipment-to-network relay that supports the connection to the first user equipment through the sidelink, a value of a newly defined corresponding information bit in the discovery message sent by the first user equipment is set to "1". After receiving the discovery message sent by the first user equipment, the eRelay UE that supports the layer-2 relay reads a value of the seventh indication information in the discovery message. If the value of the seventh indication information in the discovery message is "1", the eRelay UE that supports the layer-2 relay may determine that the first user equipment needs to discover the evolved user equipment-to-network relay that supports the connection to the first user equipment through the sidelink. Likewise, when the first user equipment needs to discover the evolved user equipment-to-network relay that supports the connection to the first user equipment through the non-3GPP access technology, a specific implementation is the same as that described above, and details are not described herein again.

In an embodiment, when the first user equipment supports both a connection, through the sidelink, to user equipment that supports the evolved user equipment-to-network relay function and a connection, through the non-3GPP technology, user equipment that supports the evolved user equipment-to-network relay function, the first user equipment sends the third message through the sidelink, and the second user equipment receives the third message through the sidelink (to be specific, the first user equipment performs discovery with the second user equipment through a discovery mechanism of the sidelink technology). The third message is used to indicate information that the first user equipment needs to discover the evolved user equipment-to-network relay that supports the connection to the first user equipment. The third message includes a discovery solicitation message, and the discovery solicitation message may be the UE-to-network relay discovery solicitation message. Information included in the discovery solicitation message includes one of the following three cases:

(1) A manner described in the foregoing embodiment D and an eighth indication information manner described in the foregoing embodiment F are used. For example, a value of the content type of the discovery solicitation message is set to 1010, indicating that the first user equipment needs to discover the evolved user equipment-to-network relay that supports the connection to the first user equipment through the sidelink. In addition, 1-bit information is set in the discovery solicitation message, or one piece of information is defined by using 1 bit in spare information in the discovery solicitation message, and the newly defined information is used to indicate that the first user equipment needs to discover the evolved user equipment-to-network relay that supports the connection to the first user equipment by using the non-3GPP interface.

(2) A sixth indication information manner described in the foregoing embodiment E is used. For example, 1-bit information is set in the discovery solicitation message, or one piece of information is defined by using 1 bit in spare information in the discovery solicitation message, and the newly defined information is used to indicate that the first user equipment needs to discover the user equipment that supports the evolved user equipment-to-network relay function. To be specific, the user equipment may be the evolved user equipment-to-network relay that supports the connection to the first user equipment through the sidelink, or may be the evolved user equipment-to-network relay that supports the connection to the first user equipment through the non-3GPP access technology.

(3) A seventh indication information and eighth indication information manner described in the foregoing embodiment F is used. For example, 2-bit information is set in the discovery solicitation message, or two pieces of information are defined by using 2 bits in spare information in the discovery solicitation message, and the two newly defined pieces of information are respectively used to indicate that the first user equipment needs to discover the evolved user equipment-to-network relay that supports the connection to the first user equipment through the sidelink and indicate that the first user equipment needs to discover the evolved user equipment-to-network relay that supports the connection to the first user equipment by using the non-3GPP interface.

In an embodiment, when the first user equipment needs to discover the evolved user equipment-to-network relay that supports the connection to the first user equipment through the sidelink, the first user equipment sends the third message through the sidelink, and the second user equipment receives the third message through the sidelink, (to be specific, the first user equipment performs the discovery with the second user equipment through the discovery mechanism of the sidelink technology). The third message is used to indicate information that the first user equipment needs to discover the evolved user equipment-to-network relay that supports the connection to the first user equipment. The third message includes a discovery solicitation message, and the discovery solicitation message may be the UE-to-network relay discovery solicitation message. Information included in the discovery solicitation message includes one of the following two cases:

(1) A manner described in the foregoing embodiment D is used. For a specific case, refer to the embodiment A, and details are not described herein again.

(2) An eighth indication information manner described in the foregoing embodiment F is used. For a specific case, refer to the embodiment F, and details are not described herein again.

In an embodiment, when the first user equipment needs to discover the evolved user equipment-to-network relay that supports the connection to the first user equipment through the non-3GPP technology, the first user equipment sends the third message by using the non-3GPP interface, and the second user equipment receives the third message by using the non-3GPP interface, (to be specific, the first user equipment performs discovery with the second user equipment through a discovery mechanism of the sidelink technology). The third message is used to indicate information that the first user equipment needs to discover the evolved user equipment-to-network relay that supports the connection to the first user equipment. The third message includes a discovery solicitation message, and the discovery solicitation message may be the UE-to-network relay discovery solicitation message. Information included in the discovery solicitation message includes one of the following two cases:

(1) A manner described in the foregoing embodiment D is used. For a specific case, refer to the embodiment A, and details are not described herein again.

(2) An eighth indication information manner described in the foregoing embodiment F is used. For a specific case, refer to the embodiment F, and details are not described herein again.

In an embodiment, an adaptation layer is configured for the first user equipment and the second user equipment, the adaptation layer of the second user equipment generates an adaptation layer protocol data unit (PDU), the adaptation layer PDU includes fifth indication information and the first message, and the fifth indication information is used to indicate that the adaptation layer PDU includes the first message. The adaptation layer of the second user equipment sends the adaptation layer PDU to the first user equipment by using a non-3GPP interface, and the adaptation layer of the first user equipment receives, by using a non-3GPP interface, the adaptation layer PDU sent by the first user equipment.

Figure 6:
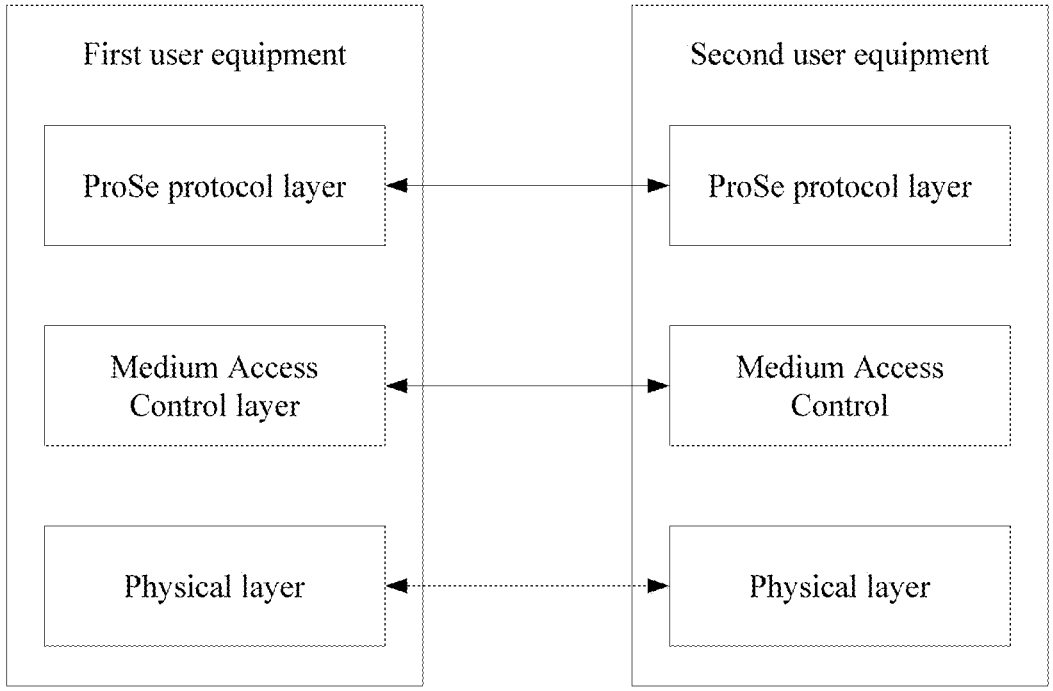
FIG. 6 is a schematic diagram of a protocol stack architecture for transmitting a PC5 discovery message by using a PC5 interface according to an embodiment of the present invention.
Figure 7:
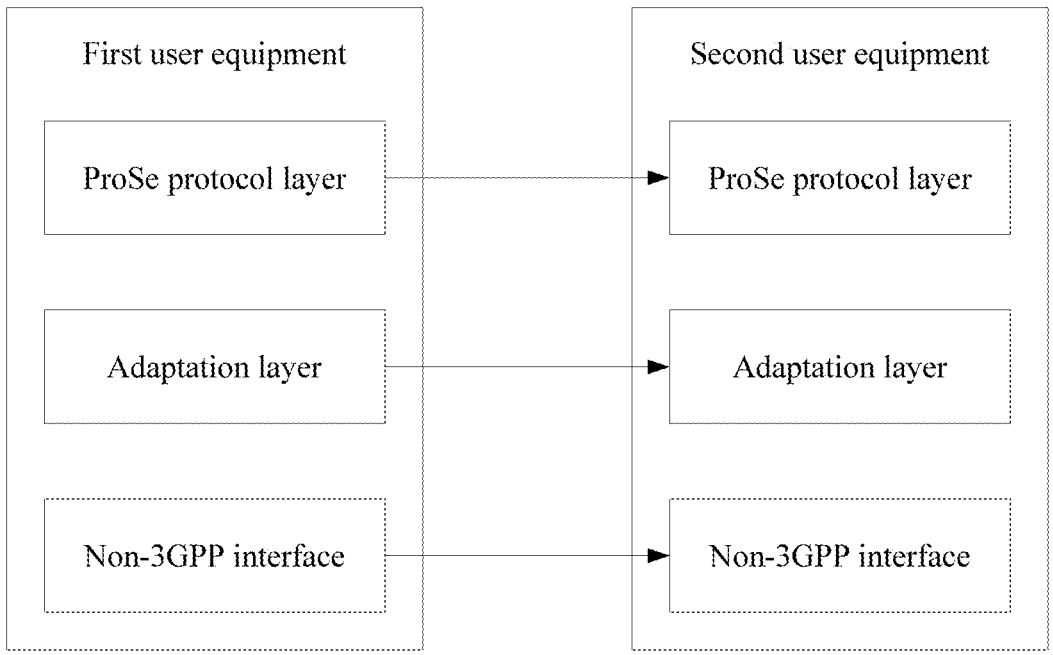
FIG. 7 is a schematic diagram of a protocol stack architecture for transmitting a PC5 discovery message through a non-3GPP technology according to an embodiment of the present invention.

Specifically, when the second user equipment supports a WLAN-based or Bluetooth technology-based layer-2 relay, the second user equipment sends a PC5 discovery message through a corresponding WLAN or Bluetooth technology. To transmit the discovery message through a WLAN or Bluetooth, a new protocol stack architecture for transmitting the PC5 discovery message needs to be defined. Currently, a protocol stack architecture for transmitting the PC5 discovery message by using the PC5 interface is shown in FIG. 6. A newly defined protocol stack architecture for transmitting the PC5 discovery message through the non-3GPP technology such as the WLAN or the Bluetooth is shown in FIG. 7.

The adaptation layer (Adaptation layer) of the second user equipment is used to: after receiving a discovery message sent by a ProSe protocol layer (ProSe Protocol layer), add indication information (namely, the fifth indication information) in front of the discovery message to form the adaptation layer PDU (Adaptation layer PDU), and the fifth indication information is used to indicate that content behind the fifth indication information is the PC5 discovery message. After receiving the adaptation layer PDU, the adaptation layer of the first user equipment may know, based on the indication information in the adaptation layer PDU, that payload included in the adaptation layer PDU is the PC5 discovery message, so as to submit the discovery message up to the ProSe protocol layer.

In an embodiment, the first message is an RRC message.

In an embodiment (embodiment G), the RRC message includes related system information of a serving cell in which the second user equipment is located; or the RRC message includes fourth indication information, and the fourth indication information is used to indicate that the second user equipment supports the evolved user equipment-to-network relay function; or the RRC message may be an RRC message that does not include any content.

Specifically, if the second user equipment supports the evolved user equipment-to-network relay function for connecting to the first user equipment through the sidelink technology, the second user equipment needs to send an RRC message through a communication mechanism of the sidelink technology to indicate that the second user equipment supports the evolved user equipment-to-network relay function for connecting to the first user equipment through the sidelink technology. Likewise, if the second user equipment supports the evolved user equipment-to-network relay function for connecting to the first user equipment through the non-3GPP technology, the second user equipment needs to send an RRC message through a communication mechanism of the non-3GPP technology to indicate that the second user equipment supports the evolved user equipment-to-network relay function for connecting to the first user equipment through the non-3GPP technology.

The RRC message may be the RRC message that does not include any content. Alternatively, the RRC message may be an RRC message that includes the related system information of the serving cell in which the second user equipment is located, and the related system information includes, for example, a tracking area code and cell identification information. The cell identification information may be a physical cell identifier (PCI, Physical cell ID), a cell identity (Cell Identity) that can uniquely identify a cell in a PLMN, or a cell global identity (Cell Global Identity, CGI) that is globally unique to a cell. Alternatively, the RRC message may be an RRC message that includes 1-bit indication information, and the 1-bit indication information is used to indicate that the second user equipment supports the layer-2 relay through the sidelink technology for connection or through the non-3GPP technology for connection.

In an embodiment, when the first user equipment supports a connection, through the sidelink technology, to the second user equipment that supports the evolved user equipment-to-network relay function, the second user equipment sends an RRC message to the first user equipment through the sidelink technology, and the first user equipment receives, through the sidelink technology, the RRC message sent by the second user equipment. The RRC message is the RRC message in the embodiment G.

In an embodiment, when the first user equipment supports a connection, through the non-3GPP technology, to the second user equipment that supports the evolved user equipment-to-network relay function, the second user equipment sends an RRC message to the first user equipment through the non-3GPP technology, and the first user equipment receives, through the non-3GPP technology, the RRC message sent by the second user equipment. The RRC message is the RRC message in the embodiment G.

Figure 8:
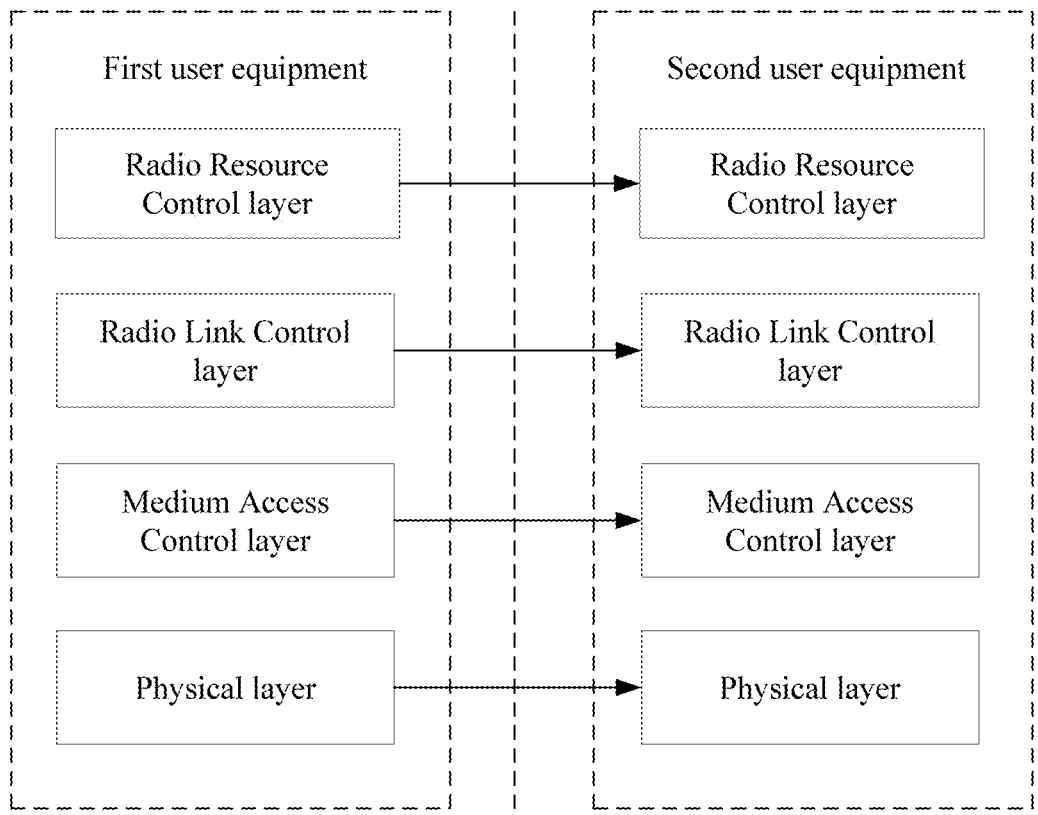
FIG. 8 is a schematic diagram of a protocol stack corresponding to a device-to-device communication mechanism based on a PC5 technology according to an embodiment of the present invention.
Figure 9:
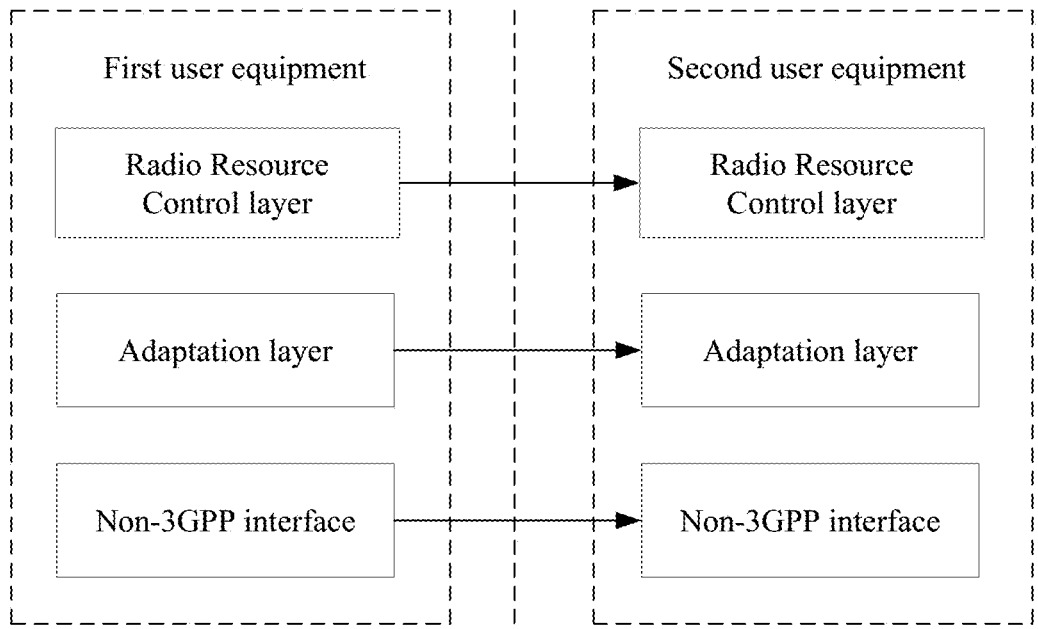
FIG. 9 is a schematic diagram of a protocol stack corresponding to a device-to-device communication mechanism based on a non-3GPP technology according to an embodiment of the present invention.

In an embodiment, a peer RRC layer is separately configured for the first user equipment and the second user equipment. When a device-to-device communication mechanism based on a PC5 technology is used between the first user equipment and the second user equipment, a corresponding protocol stack is shown in FIG. 8. When a device-to-device communication mechanism based on the non-3GPP technology such as the WLAN or the Bluetooth is used between the first user equipment and the second user equipment, a corresponding protocol stack is shown in FIG. 9.

The adaptation layer of the second user equipment is used to: after receiving an RRC message (RRC message) sent by an RRC layer of the second user equipment, add indication information in front of the RRC message to form the adaptation layer PDU, and the indication information is used to indicate that content behind the indication information is the RRC message. After receiving the adaptation layer PDU, the adaptation layer of the first user equipment may know, based on the indication information in the adaptation layer PDU, that payload included in the adaptation layer PDU is the RRC message, so as to submit the RRC message up to the RRC layer.

If the second user equipment supports a layer-2 relay that is based on the PC5 technology, the second user equipment sends an RRC message through PC5 technology broadcast. After receiving the RRC message through the PC5 technology, the first user equipment may know that the second user equipment that sends the RRC message may support the layer-2 relay that is based on the PC5 technology. Likewise, if the second user equipment supports a layer-2 relay based on a WLAN technology, the second user equipment sends an RRC message through WLAN technology broadcast. After receiving the RRC message through the WLAN technology, the first user equipment may know that the second user equipment that sends the RRC message may support the layer-2 relay that is based on the WLAN technology. Likewise, if the second user equipment supports a layer-2 relay of the Bluetooth technology, this is the same as the foregoing two cases, and details are not described herein again.

Alternatively, after the first user equipment and UE discover each other through the PC5/WLAN/Bluetooth technology, and establish a connection, if the UE supports the layer-2 relay of the PC5 technology, the UE may send an RRC message through the PC5 technology. After receiving the RRC message through the PC5 technology, the first user equipment may know that the UE that sends the RRC message may support the layer-2 relay that is based on the PC5 technology. Likewise, if the UE supports the layer-2 relay of the WLAN technology and the UE supports the layer-2 relay of the Bluetooth technology, this is the same as the foregoing case, and details are not described herein again.

Alternatively, after the first user equipment and UE discover each other through the PC5/WLAN/Bluetooth technology, and establish a connection, the first user equipment may send an RRC message through the PC5/WLAN/Bluetooth technology, and query, by using the RRC message, whether the UE can provide layer-2 relay function support for the first user equipment. Alternatively, more specifically, the first user equipment queries, by using the RRC message, whether the UE can provide layer-2 relay function support that is based on the non-3GPP access technology for the first user equipment. When UE that supports the layer-2 relay receives the RRC message sent by the first user equipment, the UE returns an RRC message as a response through the PC5/WLAN/Bluetooth technology, and notifies, by using the RRC message, the first user equipment that the layer-2 relay function support can be provided, or more specifically, notifies, by using the RRC message, the first user equipment that the layer-2 relay function support that is based on the non-3GPP access technology can be provided. After the first user equipment sends the RRC message used for query, if the first user equipment does not receive an RRC response message returned by the UE within a time length T, the first user equipment may consider that the UE does not support the layer-2 relay function, or that the UE does not support the layer-2 relay function that is based on the non-3GPP access technology. A value of the time length T may be a predefined value, or a value customized by the first user equipment.

In an embodiment, when the second user equipment supports the evolved user equipment-to-network relay function for connecting to the first user equipment through the sidelink technology, the second user equipment needs to include indication information into a master information block (namely, MIB-SL, Master Information Block-sidelink) message sent through the sidelink technology, to indicate that the second user equipment supports the evolved user equipment-to-network relay function for connecting to the first user equipment through the sidelink technology.

In an embodiment, the second user equipment sends the discovery message by using a receiving resource pool, and the first user equipment receives, by listening to the receiving resource pool, the discovery message sent by the second user equipment.

Specifically, one or more new sending resource pools and receiving resource pools are defined. These resource pools are used only to send and receive the discovery message used to discover the second user equipment that supports the layer-2 relay. For first user equipment that is outside a cell coverage area, the first user equipment may send or receive, by using a preconfigured new resource pool, the discovery message related to the layer-2 relay. For first user equipment or second user equipment that is within the cell coverage area, the first user equipment or the second user equipment may receive, by using the new resource pool that is broadcast by a base station by using system information, the discovery message related to the layer-2 relay discovery. In addition, the network device may determine whether to broadcast a sending resource pool that is used for the discovery message related to the layer-2 relay.

When the second user equipment that supports the layer-2 relay needs to send a discovery message used for layer-2 relay UE discovery, if the serving cell in which the second user equipment is located broadcasts, in the system information, the sending resource pool used to send the discovery message, the second user equipment may directly send the discovery message in the sending resource pool. If the serving cell in which the second user equipment is located broadcasts, in the system information, only the receiving resource pool used to receive the discovery message but does not broadcast the sending resource pool used to send the discovery message, the second user equipment needs to send a solicitation message to the network device, and the solicitation message requests, from the network device, the sending resource pool that is used to transmit the discovery message used for the layer-2 relay UE discovery. Subsequently, if the network device configures the sending resource pool for the second user equipment, the second user equipment may send the discovery message in the sending resource pool configured by the network device. Correspondingly, when needing to discover the UE that supports the layer-2 relay, the first user equipment may listen to the receiving resource pool. When receiving the discovery message in the receiving resource pool, the first user equipment may know that the UE that sends the discovery message supports the layer-2 relay.

In an embodiment, the second message includes first configuration information of the first user equipment and second configuration information of the second user equipment.

When the second user equipment and the first user equipment that is within the cell coverage area receive configuration information for the layer-2 relay from a current serving cell, the second user equipment and the first user equipment may know that the serving cell supports the layer-2 relay.

If a cell supports the layer-2 relay, the cell broadcasts a system message (for example, an SIB 19 defined in a current protocol or newly defined system information dedicated to an evolved user equipment-to-network operation), and includes the configuration information for the layer-2 relay into the system message. The configuration information includes configuration information of the second user equipment that supports the layer-2 relay and configuration information of the first user equipment that supports the layer-2 relay.

In an embodiment, the second configuration information includes a first threshold, and the first threshold is used to indicate that the second user equipment may send the first message to the first user equipment when an RSRP of a Uu link is higher than the first threshold. To be specific, for the second user equipment, the second configuration information includes that the reference signal received power (Reference Signal Received Power, RSRP) of the Uu link on which the second user equipment may send the discovery message used for the layer-2 relay discovery needs to meet a threshold (namely, the first threshold). The second user equipment may send the discovery message used for the layer-2 relay discovery only when the RSRP of the Uu link of the second user equipment is higher than the threshold.

In an embodiment, for the first user equipment connected to the second user equipment through the sidelink, the first configuration information includes at least one of the following: (1) a second threshold, where the second threshold is used to indicate that the first user equipment may send the third message when an RSRP of a Uu link is lower than the second threshold; and (2) a third threshold, where the third threshold is used to indicate that the first user equipment may use the second user equipment as a candidate evolved user equipment-to-network relay when an RSRP of the sidelink between the first user equipment and the second user equipment is higher than the third threshold.

To be specific, for the first user equipment, when the first user equipment uses PC5-based device-to-device communication, the first configuration information includes one or more of the following information: (1) the RSRP of the Uu link on which the first user equipment may send the discovery solicitation message used for the layer-2 relay discovery needs to meet a threshold (namely, the second threshold). The first user equipment may send the discovery solicitation message used for the layer-2 relay discovery only when the RSRP of the Uu link of the first user equipment is lower than the threshold; and (2) an RSRP of a PC5 link between the first user equipment and the second user equipment needs to meet a threshold (namely, the third threshold). The second user equipment may be used as the candidate relay only when a value of the RSRP of the PC5 link between the first user equipment and the second user equipment is higher than the threshold.

In an embodiment, for the first user equipment connected to the second user equipment by using the non-3GPP interface, the first configuration information includes at least one of the following: (1) a fourth threshold, where the fourth threshold is used to indicate that the first user equipment may indirectly communicate with a network by using the second user equipment when an RSRP of a Uu link is lower than the fourth threshold; and (2) a fifth threshold, where the fifth threshold is used to indicate that the first user equipment may use the second user equipment as a candidate evolved user equipment-to-network relay when channel quality of a non-3GPP link between the first user equipment and the second user equipment is higher than the fifth threshold. The channel quality of the non-3GPP may be an RSRP, reference signal received quality (Reference Signal Received Quality, RSRQ), or a received signal strength indicator (Received Signal Strength Indicator, RSSI) of the non-3GPP link between the first user equipment and the second user equipment.

To be specific, for the first user equipment, when the first user equipment uses WLAN-based or Bluetooth-based device-to-device communication, the first configuration information includes one or more of the following information: (1) the RSRP of the Uu link on which the remote UE may indirectly communicate with the network by using the second user equipment needs to meet a threshold (namely, the fourth threshold). The first user equipment may indirectly communicate with the network by using the second user equipment only when the RSRP of the Uu link of the first user equipment is lower than the threshold; and (2) channel quality of a WLAN link or a Bluetooth link between the first user equipment and the second user equipment needs to meet a threshold (namely, the fifth threshold). The second user equipment may be used as the candidate evolved user equipment-to-network relay only when a value of the channel quality of the WLAN link or the Bluetooth link between the first user equipment and the second user equipment is higher than the threshold.

In an embodiment, the second message includes ninth indication information and/or tenth indication information, the ninth indication information is used to indicate that the network device supports an evolved user equipment-to-network relay operation through the sidelink for connection, and the tenth indication information is used to indicate that the network device supports an evolved user equipment-to-network relay operation by using the non-3GPP interface for connection.

If a cell supports the layer-2 relay, the cell broadcasts a system message (which, for example, may be an SIB 19 defined in a current protocol or newly defined system information dedicated to an evolved user equipment-to-network operation), and an indication including whether to support the layer-2 relay operation is displayed in the system message. For example, only one piece of indication information is defined, and a layer-2 relay based on the PC5/sidelink technology is not distinguished from a layer-2 relay based on the non-3GPP technology such as the WLAN/Bluetooth. For another example, two pieces of indication information are defined and respectively used to indicate that the layer-2 relay based on the PC5 technology is supported and that the layer-2 relay based on the non-3GPP technology such as the WLAN/Bluetooth is supported.

In an embodiment, if a cell supports the layer-2 relay that is based on the sidelink technology, the cell at least broadcasts, in a broadcast message, one or more resource pools dedicated to receiving the discovery message for the layer-2 relay discovery, or one or more receiving resource pools dedicated to communicating with layer-2 relay UE. Optionally, if a cell broadcasts the receiving resource pool, it means that the cell supports the layer-2 relay that is based on the non-3GPP technology such as the WLAN and the Bluetooth. Alternatively, if the cell supports the layer-2 relay that is based on the non-3GPP technology such as the WLAN and the Bluetooth, the cell explicitly indicates, by using indication information in the broadcast message, that the layer-2 relay that is based on the non-3GPP technology such as the WLAN and the Bluetooth is supported. In addition, the cell may further broadcast one or more resource pools dedicated to sending the discovery message for the layer-2 relay discovery, or one or more receiving resource pools dedicated to communicating with the layer-2 relay UE.

It can be learned that, in this embodiment of the present invention, for the remote user equipment that supports the connection, through the sidelink technology, to the relay user equipment that provides the layer-2 relay function, on the one hand, the remote user equipment may learn, in a relay user equipment discovery process, whether discovered relay user equipment supports the layer-2 relay function, to avoid a case in which after establishing the connection to the relay user equipment that does not support the layer-2 relay function, the remote user equipment cannot establish the connection to and communicate with the network by using the relay device. In addition, resource waste caused in this process can be avoided, and an access delay or a data communication delay of the remote user equipment can be reduced. On the other hand, a case in which the remote user equipment performs a layer-2 relay user equipment discovery process in a cell that cannot support the layer-2 relay operation can be avoided.

In addition, for the remote user equipment that supports connection, through the non-3GPP technology, to the relay user equipment that provides the layer-2 relay function, after establishing a connection to other user equipment, the remote user equipment may learn whether the user equipment supports the layer-2 relay function, to avoid a case in which after establishing the connection to the relay user equipment that does not support the layer-2 relay function, the remote user equipment still attempts to establish the connection to and communicate with the network by using the relay user equipment. In addition, resource waste caused in this process can be avoided, and an access delay or a data communication delay of the remote user equipment can be reduced.

Figure 10:
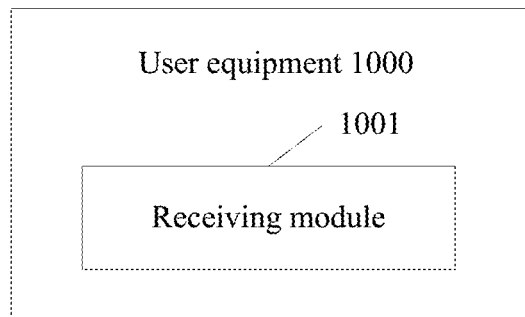
FIG. 10 is a schematic structural diagram of user equipment according to an embodiment of the present invention.

As shown in FIG. 10, an embodiment of the present invention further provides user equipment 1000, including: a receiving module tool, configured to receive a first message sent by second user equipment, where the first message includes information indicating that the second user equipment supports an evolved user equipment-to-network relay function, and the receiving module 1001 is further configured to receive a second message sent by a network device, where the second message includes information indicating that the network device supports an evolved user equipment-to-network relay, or the second message includes information indicating that a cell in which the network device sends the second message supports an evolved user equipment-to-network relay.

In an embodiment, the first message is a device-to-device discovery message, or the first message is a radio resource control layer (RRC) message.

In an embodiment, when a content type of the discovery message is a first preset value, the discovery message is an evolved user equipment-to-network relay discovery announcement message, or the discovery message is an evolved user equipment-to-network relay discovery response message.

In an embodiment, the discovery message includes first indication information, the first indication information is used to indicate that the second user equipment supports the evolved user equipment-to-network relay function, and/or the first indication information is used to indicate that the second user equipment is an evolved user equipment-to-network relay.

In an embodiment, the discovery message includes second indication information and/or third indication information, the second indication information is used to indicate that the second user equipment supports an evolved user equipment-to-network relay function for connecting to the first user equipment through a sidelink, and the third indication information is used to indicate that the second user equipment supports an evolved user equipment-to-network relay function for connecting to the first user equipment by using a non-3GPP interface.

In an embodiment, the RRC message includes related system information of a serving cell in which the second user equipment is located; or the RRC message includes fourth indication information, and the fourth indication information is used to indicate that the second user equipment supports the evolved user equipment-to-network relay function.

In an embodiment, the receiving module tool is specifically configured to: when the first user equipment supports a connection to the second user equipment through the sidelink, receive, through the sidelink, the first message sent by the second user equipment; and when the first user equipment supports a connection to the second user equipment by using the non-3GPP interface, receive, by using the non-3GPP interface, the first message sent by the second user equipment.

In an embodiment, the receiving module tool is specifically configured to: the receiving a first message sent by second user equipment includes: receiving, by the first user equipment through the sidelink, the first message sent by the second user equipment.

In an embodiment, an adaptation layer is configured for the first user equipment, and the receiving module tool is specifically configured to: receive, by using the non-3GPP interface, an adaptation layer protocol data unit (PDU) sent by the second user equipment, where the adaptation layer PDU includes fifth indication information and the first message, and the fifth indication information is used to indicate that the adaptation layer PDU includes the first message.

In an embodiment, the receiving module is specifically configured to: receive, by listening to a receiving resource pool, the discovery message sent by the second user equipment, where the receiving resource pool is used to receive the device-to-device discovery message sent by the evolved user equipment-to-network relay.

In an embodiment, the second message includes first configuration information of the first user equipment and second configuration information of the second user equipment.

In an embodiment, the second configuration information includes a first threshold, and the first threshold is used to indicate that the second user equipment is allowed to send the first message to the first user equipment when an RSRP of a Uu link is higher than the first threshold.

In an embodiment, for the first user equipment connected to the second user equipment through the sidelink, the first configuration information includes at least one of the following: (1) a second threshold, where the second threshold is used to indicate that the first user equipment is allowed to send an evolved user equipment-to-network relay discovery solicitation message when an RSRP of a Uu link is lower than the second threshold; and (2) a third threshold, where the third threshold is used to indicate that the first user equipment is allowed to use the second user equipment as a candidate evolved user equipment-to-network relay when an RSRP of the sidelink between the first user equipment and the second user equipment is higher than the third threshold.

In an embodiment, for the first user equipment connected to the second user equipment by using the non-3GPP interface, the first configuration information includes at least one of the following: (1) a fourth threshold, where the fourth threshold is used to indicate that the first user equipment is allowed to indirectly communicate with a network by using the second user equipment when an RSRP of a Uu link is lower than the fourth threshold; and (2) a fifth threshold, where the fifth threshold is used to indicate that the first user equipment uses the second user equipment as a candidate evolved user equipment-to-network relay when channel quality of a non-3GPP link between the first user equipment and the second user equipment is higher than the fifth threshold.

It should be noted that the foregoing module (the receiving module 1001) is configured to perform related steps of the foregoing method.

In this embodiment, the user equipment 1000 is presented in a form of a module. The "module" herein may be an application-specific integrated circuit (application-specific integrated circuit, ASIC), a processor and a memory that execute one or more software or firmware programs, an integrated logic circuit, and/or another component that can provide the foregoing functions. In addition, the receiving module 1001 may be implemented by using a communications interface 1203 of a computer device shown in FIG. 12.

It can be learned that, relay user equipment and a network device notify, by using indication information, eRemote UE that the relay user equipment and the network device support a layer-2 relay, or notify the eRemote UE that a cell in which the relay user equipment and the network device send the indication information supports the layer-2 relay. Therefore, a case in which after establishing a connection to relay user equipment that does not support a layer-2 relay function, the eRemote UE cannot establish a connection to and communicate with the network by using the relay user equipment is avoided. In addition, resource waste caused in this process can also be avoided, and an access delay or a data communication delay of remote user equipment can be reduced.

Figure 11:
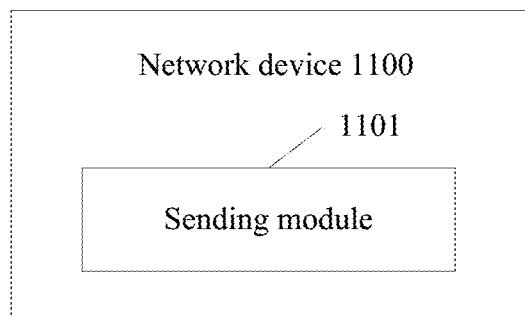
FIG. 11 is a schematic structural diagram of a network device according to an embodiment of the present invention.

As shown in FIG. 11, an embodiment of the present invention further provides a network device 1100, including: a sending module 1101, configured to send a second message, where the second message includes information indicating that the network device supports an evolved user equipment-to-network relay, or the second message includes information indicating that a cell in which the network device sends the second message supports an evolved user equipment-to-network relay.

In an embodiment, the second message includes first configuration information of the first user equipment and second configuration information of the second user equipment.

In an embodiment, the second configuration information includes a first threshold, and the first threshold is used to indicate that the second user equipment is allowed to send the first message to the first user equipment when an RSRP of a Uu link is higher than the first threshold.

In an embodiment, for the first user equipment connected to the second user equipment through a sidelink, the first configuration information includes at least one of the following: (1) a second threshold, where the second threshold is used to indicate that the first user equipment is allowed to send an evolved user equipment-to-network relay discovery solicitation message when an RSRP of a Uu link is lower than the second threshold; and (2) a third threshold, where the third threshold is used to indicate that the first user equipment is allowed to use the second user equipment as a candidate evolved user equipment-to-network relay when an RSRP of the sidelink between the first user equipment and the second user equipment is higher than the third threshold.

In an embodiment, for the first user equipment connected to the second user equipment by using a non-3GPP interface, the first configuration information includes at least one of the following: (1) a fourth threshold, where the fourth threshold is used to indicate that the first user equipment is allowed to indirectly communicate with a network by using the second user equipment when an RSRP of a Uu link is lower than the fourth threshold; and (2) a fifth threshold, where the fifth threshold is used to indicate that the first user equipment uses the second user equipment as a candidate evolved user equipment-to-network relay when channel quality of a non-3GPP link between the first user equipment and the second user equipment is higher than the fifth threshold.

In this embodiment, the network device 1100 is presented in a form of a module. The "module" herein may be an application-specific integrated circuit (application-specific integrated circuit, ASIC), a processor and a memory that execute one or more software or firmware programs, an integrated logic circuit, and/or another component that can provide the foregoing functions. In addition, the sending module 1101 may be implemented by using a communications interface 1203 of a computer device shown in FIG. 12.

It can be learned that, a network device notifies, by using indication information, eRemote UE and relay UE that a cell in which the network device sends the indication information supports a layer-2 relay. Therefore, a case in which after establishing a connection to relay user equipment that does not support a layer-2 relay function, the eRemote UE cannot establish a connection to and communicate with the network by using the relay user equipment is avoided. In addition, resource waste caused in this process can also be avoided, and an access delay or a data communication delay of remote user equipment can be reduced.

Figure 12:
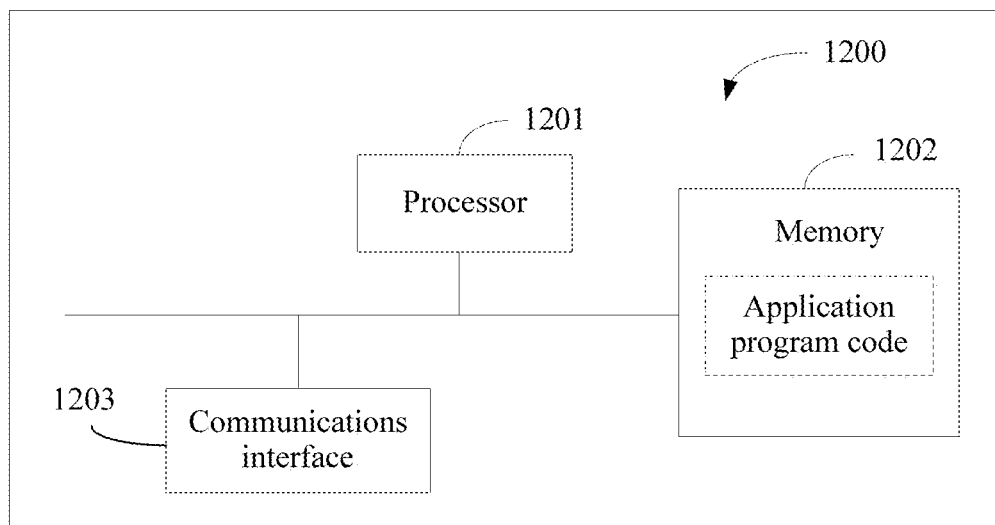
FIG. 12 is a schematic structural diagram of a computer device according to an embodiment of the present invention.

As shown in FIG. 12, a computer device 1200 may be implemented in a structure shown in FIG. 12. The computer device 1200 includes user equipment and a network device. The computer device 1200 includes at least one processor 1201, at least one memory 1202, and at least one communications interface 1203. The processor 1201, the memory 1202, and the communications interface 1203 are connected and communicate with each other by using the communications bus.

The processor 1201 may be a general-purpose central processing unit (CPU), a microprocessor, an application-specific integrated circuit (application-specific integrated circuit, ASIC), or one or more integrated circuits for controlling execution of the foregoing solution program.

The communications interface 1203 is configured to communicate with another device or a communications network, such as an Ethernet, a radio access network (RAN), or a wireless local area network (Wireless Local Area Network, WLAN).

The memory 1202 may be a read-only memory (read-only memory, ROM) or another type of static storage device capable of storing static information and instructions, or a random access memory (random access memory, RAM) or another type of dynamic storage device capable of storing information and instructions; or may be an electrically erasable programmable read-only memory (Electrically Erasable Programmable Read-Only Memory, EEPROM), a compact disc read-only memory (Compact Disc Read-Only Memory, CD-ROM), or other compact disc storage or optical disc storage (including a compressed optical disc, a laser disc, an optical disc, a digital universal optical disc, a Blu-ray optical disc, and the like), a magnetic disk storage medium or another magnetic storage device, or any other medium capable of carrying or storing expected program code in a form of instructions or data structures and capable of being accessed by a computer, but is not limited thereto. The memory may exist independently and is connected to the processor by using a bus. The memory may be alternatively integrated with the processor.

The memory 1202 is configured to store application program code for executing the foregoing solutions, and the processor 1201 controls the execution. The processor 1201 is configured to execute the application program code stored in the memory 1202.

It is assumed that when the computer device 1200 is user equipment, the foregoing indication method performed by first user equipment provided above may be performed by using the code stored in the memory 1202, for example, receiving a first message sent by second user equipment, where the first message includes information indicating that the second user equipment supports an evolved user equipment-to-network relay function; and receiving a second message sent by a network device, where the second message includes information indicating that the network device supports an evolved user equipment-to-network relay, or the second message includes information indicating that a cell in which the network device sends the second message supports an evolved user equipment-to-network relay.

It is assumed that when the computer device 1200 is a network device, the foregoing indication method performed by the network device provided above may be performed by using the code stored in the memory 1202, for example, sending a second message, where the second message includes information indicating that the network device supports an evolved user equipment-to-network relay, or the second message includes information indicating that a cell in which the network device sends the second message supports an evolved user equipment-to-network relay.

It can be learned that, relay user equipment and a network device notify, by using indication information, eRemote UE that the relay user equipment and the network device support a layer-2 relay, or notify the eRemote UE that a cell in which the relay user equipment and the network device send the indication information supports the layer-2 relay. Therefore, a case in which after establishing a connection to relay user equipment that does not support a layer-2 relay function, the eRemote UE cannot establish a connection to and communicate with a network by using the relay user equipment is avoided. In addition, resource waste caused in this process can also be avoided, and an access delay or a data communication delay of remote user equipment can be reduced.

An embodiment of the present invention further provides a computer storage medium. The computer storage medium may store a program, and when the program is executed, some or all of the steps of an indication method performed by user equipment in the foregoing method embodiments are performed.

An embodiment of the present invention further provides a computer storage medium. The computer storage medium may store a program, and when the program is executed, some or all of the steps of an indication method performed by a network device in the foregoing method embodiments are performed.

It should be noted that, to make the description brief, the foregoing method embodiments are expressed as a series of actions. However, a person skilled in the art should appreciate that the present invention is not limited to the described action sequence, because according to the present invention, some steps may be performed in other sequences or performed simultaneously. In addition, a person skilled in the art should also appreciate that all the embodiments described in this specification are example embodiments, and the related actions and modules are not necessarily mandatory to the present invention.

In the foregoing embodiments, the description of each embodiment has respective focuses. For a part that is not described in detail in an embodiment, reference may be made to related descriptions in other embodiments.

In the several embodiments provided in this application, it should be understood that the disclosed apparatus may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable memory. Based on such an understanding, the technical solutions of the present invention essentially, or the part contributing to the prior art, or all or some of the technical solutions may be implemented in the form of a software product. The software product is stored in a storage and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a read-only memory (ROM, Read-Only Memory), a random access memory (RAM, Random Access Memory), a removable hard disk, a magnetic disk, or an optical disc.

A person of ordinary skill in the art may understand that all or some of the steps of the methods in the embodiments may be implemented by a program instructing related hardware. The program may be stored in a computer readable storage medium. The storage medium may include a flash memory, a read-only memory (English: Read-Only Memory, ROM for short), a random access memory (English: Random Access Memory, RAM for short), a magnetic disk, and an optical disc.

The embodiments of the present invention are described in detail above. The principle and implementation of the present invention are described herein through specific examples. The description about the embodiments of the present invention is merely provided to help understand the method and core ideas of the present invention. In addition, a person of ordinary skill in the art can make variations and modifications to the present invention in terms of the specific implementations and application scopes according to the ideas of the present invention. Therefore, the content of this specification shall not be construed as a limitation on the present invention.

What is claimed is:

1. A method, comprising:
  receiving, by first user equipment, a first message sent by second user equipment, wherein the first message comprises first indication information indicating that the second user equipment supports an user equipment-to-network relay function based on a layer-2, and wherein the first message is a device-to-device discovery message; and
  receiving, by the first user equipment, a second message sent by a network device, wherein the second message comprises first information and second information, wherein the first information indicates that at least one of the network device or a cell in which the network device sends the second message supports the user equipment-to-network relay function based on the layer-2, wherein the second information comprises a third threshold used by the first user equipment to determine the second user equipment to be a layer-2 user equipment-to-network relay in response to a reference signal receive power (RSRP) of a wireless link between the first user equipment and the second user equipment being higher than the third threshold, and wherein the second message is a system information message.

2. The method according to claim 1, wherein a content type of the device-to-device discovery message is a first preset value, and the device-to-device discovery message is at least one of:
an user equipment-to-network relay discovery announcement message; or
an user equipment-to-network relay discovery response message.

3. The method according to claim 1, wherein:
the device-to-device discovery message further comprises at least one of second indication information or third indication information;
wherein the second indication information indicates that the second user equipment supports a first user equipment-to-network relay function based on the layer-2, and the first user equipment-to-network relay function based on the layer-2 is used to connect the second user equipment to the first user equipment through a sidelink; and
wherein the third indication information indicates that the second user equipment supports a second user equipment-to-network relay function based on the layer-2, and wherein the second user equipment-to-network relay function based on the layer-2 is used to connect the second user equipment to the first user equipment using a non-$3^{rd}$ generation partnership project (3GPP) interface.

4. The method according to claim 3, wherein receiving, by first user equipment, the first message sent by second user equipment comprises:
when the first user equipment supports the first user equipment-to-network relay function based on the layer-2, receiving, by the first user equipment through the sidelink, the first message sent by the second user equipment; and
when the first user equipment supports the second user equipment-to-network relay function based on the layer-2, receiving, by the first user equipment using the non-3GPP interface, the first message sent by the second user equipment.

5. The method according to claim 3, wherein an adaptation layer is configured for the first user equipment, and receiving, by the first user equipment using the non-3GPP interface, the first message sent by the second user equipment comprises:
receiving, by the adaptation layer of the first user equipment using the non-3GPP interface, an adaptation layer protocol data unit (PDU) sent by the second user equipment, wherein the adaptation layer PDU comprises fifth indication information and the first message, and the fifth indication information indicates that the adaptation layer PDU comprises the first message.

6. The method according to claim 3, wherein the second message comprises first configuration information of the first user equipment and second configuration information of the second user equipment.

7. The method according to claim 6, wherein the second configuration information comprises a first threshold, and the first threshold indicates that the second user equipment is allowed to send the first message to the first user equipment in response to a RSRP of a wireless link between the network device and the second user equipment being higher than the first threshold.

8. The method according to claim 6, wherein the second user equipment supports the first user equipment-to-network relay function based on the layer-2, and the first configuration information comprises:
a second threshold, wherein the second threshold indicates that the first user equipment is allowed to send an user equipment-to-network relay discovery solicitation message when a (RSRP) of a wireless link between the network device and the first user equipment is lower than the second threshold; or
a third threshold, wherein the third threshold indicates that the first user equipment is allowed to use the second user equipment as a candidate user equipment-to-network relay when an RSRP of the sidelink between the first user equipment and the second user equipment is higher than the third threshold.

9. The method according to claim 6, wherein the second user equipment supports the second user equipment-to-network relay function based on the layer-2, and the first configuration information comprises:
a fourth threshold, wherein the fourth threshold indicates that the first user equipment is allowed to indirectly communicate with a network using the second user equipment when a (RSRP) of a wireless link between the network device and the first user equipment is lower than the fourth threshold; or
a fifth threshold, wherein the fifth threshold indicates that the first user equipment uses the second user equipment as a candidate user equipment-to-network relay when channel quality of the non-3GPP interface between the first user equipment and the second user equipment is higher than the fifth threshold.

10. The method according to claim 1, wherein receiving, by the first user equipment, the first message sent by the second user equipment comprises:
receiving, by the first user equipment by listening to a receiving resource pool, the first message sent by the second user equipment, wherein the first message is the device-to-device discovery message, the second user equipment is an user equipment-to-network relay device based on the layer-2, and the receiving resource pool is used to receive the device-to-device discovery message sent by the user equipment-to-network relay device based on the layer-2.

11. A method, comprising:
sending, by a network device, a second message, wherein the second message comprises:
information indicating that at least one of the network device or a cell in which the network device sends the second message supports an user equipment-to-network relay function based on a layer-2; and
information comprising a third threshold used by a first user equipment to determine a second user equipment to be layer-2 user equipment-to-network relay in response to a reference signal receive power (RSRP) of wireless link between the first user equipment and the second user equipment being higher than the third threshold.

12. The method according to claim 11, wherein the second message comprises first configuration information of a first user equipment and second configuration information of a second user equipment.

13. The method according to claim 12, wherein the second configuration information comprises a first threshold, and the first threshold indicates that the second user equipment is allowed to send a first message to the first user equipment in response to a RSRP of a wireless link between the network device and the second user equipment being higher than the first threshold.

14. The method according to claim 12, wherein:
a first user equipment is connected to the second user equipment through a sidelink; and
the first configuration information comprises:
a second threshold, wherein the second threshold indicates that the first user equipment is allowed to send a user equipment-to-network relay discovery solicitation message when an RSRP of a wireless link between the network device and the first user equipment is lower than the second threshold.

15. The method according to claim 12, wherein:
a first user equipment is connected to the second user equipment using a non-3$^{rd}$ generation partnership project (3GPP) interface; and
the first configuration information comprises:
a fourth threshold, wherein the fourth threshold indicates that the first user equipment is allowed to indirectly communicate with a network using the second user equipment when a (RSRP) of a wireless link between the network device and the first user equipment is lower than the fourth threshold; and
a fifth threshold, wherein the fifth threshold indicates that the first user equipment uses the second user equipment as a candidate user equipment-to-network relay when channel quality of a non-3GPP link between the first user equipment and the second user equipment is higher than the fifth threshold.

16. A user equipment, comprising:
a processor; and
a non-transitory memory connected to the processor and storing a program for execution by the processor, the program including instructions to:
configured to receive a first message sent by a second user equipment, wherein the first message comprises first indication information indicating that the second user equipment supports a user equipment-to-network relay function based on a layer-2, and wherein the first message is a device-to-device discovery message; and
receive a second message sent by a network device, wherein the second message comprises first information and second information, wherein the first information indicates that at least one of the network device or a cell in which the network device sends the second message supports the user equipment-to-network relay function based on the layer-2, wherein the second information comprises a third threshold used by the user equipment to determine the second user equipment to be a layer-2 user equipment-to-network relay in response to a reference signal receive power (RSRP) of a wireless link between the user equipment and the second user equipment being higher than the third threshold, and wherein the second message is a system information message.

17. The user equipment according to claim 16, wherein a content type of the device-to-device discovery message is a first preset value, and wherein the device-to-device discovery message is at least one of:
a user equipment-to-network relay discovery announcement message; or
a user equipment-to-network relay discovery response message.

18. The user equipment according to claim 16, wherein the device-to-device discovery message further comprises at least one of second indication information or third indication information;
wherein the second indication information indicates that the second user equipment supports a first user equipment-to-network relay function based on the layer-2, and wherein the first user equipment-to-network relay function based on the layer-2 is used to connect the second user equipment to the first user equipment through a sidelink; and
wherein the third indication information indicates that the second user equipment supports a second user equipment-to-network relay function based on the layer-2, and wherein the second user equipment-to-network relay function based on the layer-2 is used to connect the second user equipment to the first user equipment using a non-3$^{rd}$ generation partnership project (3GPP) interface.

19. The user equipment according to claim 18, wherein the instructions to receive the first message sent by the second user equipment comprises:
receive, through the sidelink, in response to the user equipment supporting the first user equipment-to-network relay function based on the layer-2, the first message sent by the second user equipment; and
receive, using the non-3GPP interface, in response to the user equipment supporting the second user equipment-to-network relay function based on the layer-2, the first message sent by the second user equipment.

* * * * *